United States Patent
Thubert et al.

(10) Patent No.: US 10,798,012 B2
(45) Date of Patent: Oct. 6, 2020

(54) JITTER ELIMINATION AND LATENCY COMPENSATION AT DETNET TRANSPORT EGRESS

(71) Applicant: Cisco Technology, Inc., San Jose, CA (US)

(72) Inventors: Pascal Thubert, La Colle sur Loup (FR); Patrick Wetterwald, Mouans Sartoux (FR); Eric Michel Levy-Abegnoli, Valbonne (FR); Jean-Philippe Vasseur, Saint Martin d'Uriage (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/136,947

(22) Filed: Sep. 20, 2018

(65) Prior Publication Data
US 2019/0132253 A1    May 2, 2019

Related U.S. Application Data

(60) Provisional application No. 62/578,985, filed on Oct. 30, 2017.

(51) Int. Cl.
*H04L 12/841* (2013.01)
*H04L 12/801* (2013.01)
(Continued)

(52) U.S. Cl.
CPC .......... *H04L 47/283* (2013.01); *H04L 45/121* (2013.01); *H04L 47/193* (2013.01);
(Continued)

(58) Field of Classification Search
CPC ....... H04L 12/911; H04L 47/24; H04L 47/70; H04L 12/727; H04L 12/801;
(Continued)

(56) References Cited

U.S. PATENT DOCUMENTS 8,526,443 B2    9/2013    Baykal et al.
8,711,752 B2    4/2014    Liu et al.
(Continued)

FOREIGN PATENT DOCUMENTS

JP    2000174818 A    6/2000

OTHER PUBLICATIONS

Broadcom, "BCM53570 1G/2.5G/10G/25G TSN Connectivity Switch", Product Brief, [online], [retrieved on Jul. 9, 2018]. Retrieved from the Internet: URL: <https://docs.broadcom.com/docs/53570-PB101>, 2 pages.

(Continued)

*Primary Examiner* — Hardikkumar D Patel
(74) *Attorney, Agent, or Firm* — Leon R. Turkevich

(57) ABSTRACT

In one embodiment, a method comprises receiving, by a transport layer executed by a processor circuit in an apparatus, an identifiable grouping of data; storing, by the transport layer, the data as transport layer packets in a buffer circuit in the apparatus, the storing including inserting into each transport layer packet a grouping identifier that identifies the transport layer packets as belonging to the identifiable grouping; and causing, by the transport layer, a plurality of transmitting deterministic network interface circuits to deterministically retrieve the transport layer packets from the buffer circuit for deterministic transmission across respective deterministic links, the grouping identifier enabling receiving deterministic network interface circuits to group the received transport layer packets, regardless of deterministic link, into a single processing group for a next receiving transport layer.

20 Claims, 25 Drawing Sheets

(51) Int. Cl.
  *H04L 12/851* (2013.01)
  *H04L 12/875* (2013.01)
  *H04L 12/861* (2013.01)
  *H04L 12/727* (2013.01)

(52) U.S. Cl.
  CPC .......... *H04L 47/2483* (2013.01); *H04L 47/56* (2013.01); *H04L 49/9005* (2013.01)

(58) Field of Classification Search
  CPC ... H04L 12/851; H04L 12/861; H04L 12/875; H04L 47/283; H04L 47/193; H04L 45/121; H04L 47/56; H04L 49/9005; H04L 47/2483; H04L 29/06; H04L 67/1095; H04L 12/26; H04L 12/721; H04L 43/0876; H04L 43/10; H04L 47/125; H04L 41/0896; H04L 12/64; H04L 12/6418; H04L 65/80; H04W 84/18; H04W 4/70
  See application file for complete search history.

(56) References Cited

U.S. PATENT DOCUMENTS

| | | | |
|---|---|---|---|
| 8,897,135 | B2 | 11/2014 | Thubert et al. |
| 9,088,502 | B2 | 7/2015 | Thubert et al. |
| 9,112,788 | B2 | 8/2015 | Thubert et al. |
| 9,226,292 | B2 | 12/2015 | Thubert et al. |
| 9,246,794 | B2 | 1/2016 | Thubert et al. |
| 9,264,243 | B2 | 2/2016 | Thubert et al. |
| 9,320,036 | B2 | 4/2016 | Thubert et al. |
| 9,338,086 | B2 | 5/2016 | Thubert et al. |
| 2003/0028661 | A1* | 2/2003 | Burger ............... H04L 65/80 709/231 |
| 2005/0278459 | A1 | 12/2005 | Boucher et al. |
| 2006/0227811 | A1 | 10/2006 | Hussain et al. |
| 2007/0165518 | A1 | 7/2007 | Bruckman et al. |
| 2009/0006641 | A1 | 1/2009 | Yaqoob et al. |
| 2013/0111053 | A1* | 5/2013 | Perreault ............ H04L 69/16 709/231 |
| 2015/0023327 | A1 | 1/2015 | Thubert et al. |
| 2016/0308789 | A1 | 10/2016 | Schmelzer et al. |
| 2017/0222920 | A1 | 8/2017 | Thubert et al. |
| 2017/0295101 | A1* | 10/2017 | Hira ................... H04L 43/0876 |
| 2017/0373979 | A1* | 12/2017 | Speight .............. H04L 47/70 |
| 2018/0103094 | A1* | 4/2018 | Wetterwald ........ H04L 67/42 |

OTHER PUBLICATIONS

IEC, "62439-3 Ed.2.0: Industrial communication networks—High availability automation networks—Part 3: Parallel Redundancy Protocol (PRP) and High-availability Seamless Redundancy (HSR)", 2012, pp. 1-84.
AVNU Alliance, "AVNU", 2018, [online], [retrieved on Jul. 9, 2018]. Retrieved from the Internet: URL: <http://avnu.org/>, pp. 1-2.
Cisco, "Parallel Redundancy Protocol (PRP) for IE 4000, IE 4010, and IE 5000 Switches", Jun. 26, 2018, [online], [retrieved on Jul. 9, 2018]. Retrieved from the Internet: URL: <https://www.cisco.com/c/en/us/td/docs/switches/lan/industrial/software/configuration/guide/b_prp_ie4k_5k.pdf>, pp. 1-28.
IETF Datatracker, "Deterministic Networking (detnet)", Jul. 5, 2018, [online], [retrieved on Jul. 9, 2018]. Retrieved from the Internet: URL: <https://datatracker.ietf.org/wg/detnet/about/>, pp. 1-4.
Finn, "Time-sensitive and Deterministic Networking Whitepaper", Jul. 11, 2017, [online], [retrieved on Aug. 24, 2018]. Retrieved from the Internet: URL: <https://mentor.ieee.org/802.24/dcn/17/24-17-0020-00-sgtg-contribution-time-sensitive-and-deterministic-networking-whitepaper.pdf>, pp. 1-24.
IEEE 802.1 Time-Sensitive Networking Task Group "Time-Sensitive Networking Task Group", May 3, 2017, [online], [retrieved on Jul. 9, 2018]. Retrieved from the Internet: URL: <http://www.ieee802.org/1/pages/tsn.html>, pp. 1-4.
Industrial Internet Consortium, "Smart Printing Factory", 2018, [online], [retrieved on Jul. 9, 2018]. Retrieved from the Internet: URL: <https://www.iiconsortium.org/>, pp. 1-5.
Cisco, "Configuring Resilient Ethernet Protocol", [online], [retrieved on Jul. 9, 2018]. Retrieved from the Internet: URL: <https://www.cisco.com/c/en/us/td/docs/ios-xml/ios/lanswitch/configuration/xe-3s/asr903/lanswitch-xe-3s-asr903-book/lsw-cfg-rep.pdf>, pp. 1-28.
Nelakuditi et al., "Fast Local Rerouting for Handling Transient Link Failures", IEEE/ACM Transactions on Networking, vol. 15, No. 2, Apr. 2007, [online], [retrieved on Mar. 23, 2018]. Retrieved from the Internet: URL: <http://ieeexplore.ieee.org/document/4154760/>, pp. 359-372.
Cho et al., "Independent Directed Acyclic Graphs for Resilient Multipath Routing", IEEE/ACM Transactions on Networking vol. 20, No. 1, Feb. 2012, [online], [retrieved on Mar. 23, 2018]. Retrieved from the Internet: URL: <http://ieeexplore.ieee.org/document/6003807/>, pp. 153-162.
OPC Foundation, "Unified Architecture", 2018, [online], [retrieved on Jul. 9, 2018]. Retrieved from the Internet: URL: <https://opcfoundation.org/about/opc-technologies/opc-ua/>, pp. 1-3.
Da Silva Curiel, "Use of the Delay-Tolerant Networking Bundle protocol from space", 59th International Astronautical Congress, Glasgow, B2-3 Near-Earth and Interplanetary Communications Systems, [online], Sep. 30, 2008, [retrieved on Mar. 20, 2018]. Retrieved from the Internet: URL: <http://personal.ee.surrey.ac.uk/Personal/L.Wood/publications/wood-dtn-bundle-space-slides-IAC-08.B2.3.10.show.pdf>, 15 pages.
Ilango et al., "Deterministic Multicast Link Based Energy Optimized Routing in MANET", IEEE 2017, [online], [retrieved on Mar. 20, 2018]. Retrieved from the Internet: <URL: http://ieeexplore.ieee.org/document/8117854/>, 10 pages.
Wetterwald et al., U.S. Appl. No. 15/725,502, filed Oct. 5, 2017.
Thubert et al., U.S. Appl. No. 15/784,401, filed Oct. 16, 2017.
Thubert et al., U.S. Appl. No. 15/787,790, filed Oct. 19, 2017.
Thubert et al., U.S. Appl. No. 15/713,827, filed Sep. 25, 2017.

* cited by examiner

JITTER ELIMINATION AND LATENCY COMPENSATION AT DETNET TRANSPORT EGRESS

This application claims priority to Provisional Application No. 62/578,985, filed Oct. 30, 2017.

TECHNICAL FIELD

The present disclosure generally relates to jitter elimination and latency compensation at a Deterministic Network (DetNet) Transport egress.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

The Internet Engineering Task Force (IETF) Deterministic Networking (DetNet) Working Group is addressing proposals for satisfying the stringent requirements of deterministic data networks (e.g., minimal jitter (i.e., minimal packet delay variation), low latency, minimal packet loss, and high reliability). The DetNet Working Group is investigating proposals for networks that are under a single administrative control or within a closed group of administrative control, where such networks within the single/closed group of administrative control can provide forwarding along a multi-hop path with the deterministic properties of controlled latency, low packet low, low packet delay variation, and high reliability. One proposal for low power and lossy network (LLN) devices is a routing protocol that provides IPv6 routing using time slotted channel hopping (TSCH) based on IEEE 802.15.4e ("6TiSCH"), enabling wireless LLN devices to use low-power operation and channel hopping for higher reliability.

Deterministic transmission in wired networks can use time sensitive networking (TSN) and/or audio/video bridging (AVB) for deterministic networks such as professional and home audio/video, multimedia in transportation, vehicle engine control systems, and/or other general industrial and/or vehicular applications. Neither TSN nor AVB use time slots; rather, TSN uses time-based shapers that allocate time slices and guard bands to cause a data packet to be sent or received at a given intermediate node (i.e., hop) along a path at a prescribed precise time that is reserved exclusively for the given hop; AVB can use credit-based shapers that ensure bounded latency transmit/receive queues in each hop without congestion, thereby ensuring a bounded latency.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1A:
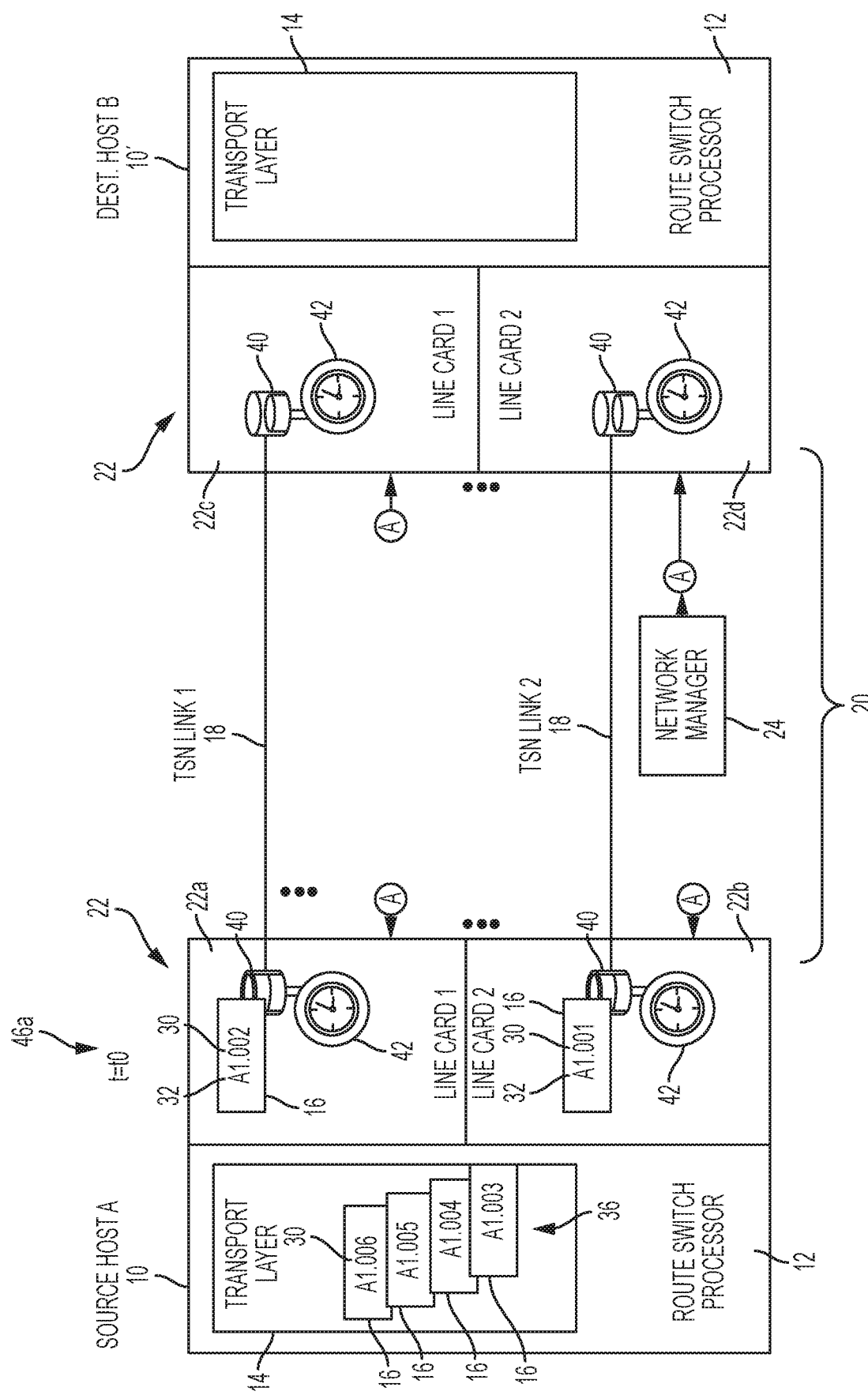
FIGS. 1A-1J illustrates one or more host devices comprising a transport layer providing deterministic transport of transport layer packets across multiple deterministic links in an example deterministic data network, according to an example embodiment.

In one embodiment, a method comprises: receiving, by a transport layer executed by a processor circuit in an apparatus, an identifiable grouping of data; storing, by the transport layer, the data as transport layer packets in a buffer circuit in the apparatus, the storing including inserting into each transport layer packet a grouping identifier that identifies the transport layer packets as belonging to the identifiable grouping; and causing, by the transport layer, a plurality of transmitting deterministic network interface circuits to deterministically retrieve the transport layer packets from the buffer circuit for deterministic transmission across respective deterministic links, the grouping identifier enabling receiving deterministic network interface circuits to group the received transport layer packets, regardless of deterministic link, into a single processing group for a next receiving transport layer.

In another embodiment, one or more non-transitory tangible media are encoded with logic for execution by a machine and when executed by the machine operable for: receiving, by a transport layer executed by a processor circuit in the machine, an identifiable grouping of data; storing, by the transport layer, the data as transport layer packets in a buffer circuit in the machine, the storing including inserting into each transport layer packet a grouping identifier that identifies the transport layer packets as belonging to the identifiable grouping; and causing, by the transport layer, a plurality of transmitting deterministic network interface circuits to deterministically retrieve the transport layer packets from the buffer circuit for deterministic transmission across respective deterministic links, the grouping identifier enabling receiving deterministic network interface circuits to group the received transport layer packets, regardless of deterministic link, into a single processing group for a next receiving transport layer.

In another embodiment, a method comprises: receiving, by a receiving deterministic network interface circuit, a deterministic packet via a deterministic link established with a transmitting deterministic network interface circuit, the deterministic packet containing a transport layer packet originated by a source transport layer and the transport layer packet specifying a grouping identifier that identifies the transport layer as belonging to an identifiable grouping of data; determining, based on the grouping identifier, a latency of the deterministic packet via the deterministic link; and sending the transport layer packet to a device with instructions for grouping the transport layer packet, according to the latency, with other received transport layer packets into a single processing group for processing by a receiving transport layer executed in the device.

In another embodiment, an apparatus comprises a plurality of deterministic network interface circuits, and a transport layer processor device. Each deterministic network interface circuit configured for receiving a deterministic packet via a deterministic link established with a corresponding transmitting deterministic network interface circuit, the deterministic packet containing a transport layer packet originated by a source transport layer and the transport layer packet specifying a grouping identifier that identifies the transport layer as belonging to an identifiable grouping of data. Each deterministic network interface circuit also is configured for determining, based on the grouping identifier, a latency of the deterministic packet via the deterministic link. The transport layer processor device is configured for executing a receiving transport layer for transport layer processing of received transport layer packets. Further, each deterministic network interface circuit is configured for sending the transport layer packet, to the transport layer processor device, with instructions for grouping the transport layer packet, according to the latency, with other received transport layer packets into a single processing group for the transport layer processing of the single processing group.

In another embodiment, one or more non-transitory tangible media encoded is with logic for execution by a machine and when executed by the machine operable for: receiving, by a receiving deterministic network interface circuit, a deterministic packet via a deterministic link established with a transmitting deterministic network interface circuit, the deterministic packet containing a transport layer packet originated by a source transport layer and the transport layer packet specifying a grouping identifier that identifies the transport layer as belonging to an identifiable grouping of data; determining, based on the grouping identifier, a latency of the deterministic packet via the deterministic link; and sending the transport layer packet to a device with instructions for grouping the transport layer packet, according to the latency, with other received transport layer packets into a single processing group for processing by a receiving transport layer executed in the device.

DETAILED DESCRIPTION

Particular embodiments enable insertion of a grouping identifier for transport layer packets that are to be transmitted across multiple deterministic links in a deterministic data network. The grouping identifier, inserted by a source transport layer, enables receiving deterministic network interface circuits to group the received transport layer packets, regardless of different jitter and/or latency attributes encountered across the different deterministic links, into a single processing group for a next receiving transport layer (e.g., an intermediate transport layer executed in an intermediate network device, or a destination transport layer executed in a destination host device).

Hence, transport layer packets transmitted across different deterministic links can be regrouped together into a single processing group for the next receiving transport layer (e.g., at an intermediate network device or a destination host), and the transport layer packets can be supplied, as a single processing group, to the transport layer for processing. The supply of the transport layer packets in the single processing group enables the receiving transport layer to perform transport layer processing on any or all of the transport layer packets associated with the identified grouping (e.g., packet reordering, elimination of duplicate packets, recovery of lost packets using one or more encoded packets in the single processing group, etc.). The supply of the received transport layer packets as a single processing group enables the processing group to be handled with minimal delays by the receiving transport layer. The supply of the received transport layer packets as a single processing group also enables different processing groups to be supplied to different processor cores, enabling distributed processing of a transport layer across multiple processor cores.

A description will first be provided of the host device providing deterministic transport of a flow of application data via transport layer packets across multiple deterministic links in a deterministic data network, followed by a description of the transport layer grouping transport layer packets using grouping identifiers for reassembly of the received transport layer packets into a single processing group for a next receiving transport layer.

Transport Layer Providing Deterministic Transport Across Multiple Deterministic Data Links Particular embodiments enable deterministic transport of a flow of application data across multiple deterministic data links (i.e., deterministic links) in a deterministic data network, even if the executable application generating the application data is incapable of providing the flow of application data according to the precise synchronization requirements of the deterministic links, based on a transport layer storing the application data in a transport buffer circuit as transport layer packets having respective transport sequence identifiers that identify their relative positions relative to a transmit order, and causing deterministic network interface circuits to deterministically retrieve the transmit layer packets, in the transmit order, from the transport buffer circuit for deterministic transmission across the respective deterministic links. The transport sequence identifiers enable the next receiving transport layer (e.g., an intermediate transport layer and/or a destination transport layer) to recover the transmit order of the prior transmitting transport layer following the deterministic transmission across the deterministic links, regardless of order of reception thereof by the next receiving transport layer.

A deterministic data network typically requires strict timing synchronization and scheduling along each hop from a source host to a destination host. A network manager (e.g., a TSN controller, scheduler, etc.) within the deterministic data network can have a prescribed management domain (i.e., deterministic domain) for controlling each network device along the deterministic path, starting with the source deterministic network interface circuits transmitting the data packets into the deterministic data network, continuing with each deterministic switching device along the deterministic path, and ending with the destination deterministic network interface circuits at the end of the deterministic path. Hence, the network controller can establish, for each deterministic data link along a deterministic path, a scheduled transmit time for the corresponding transmitting deterministic network interface circuit, a scheduled receive time for the corresponding receiving deterministic network interface circuit, and a common time reference used for synchronization of each of the deterministic network devices in the deterministic domain. Deterministic networks can be used for industrial automation, vehicle control systems, and other systems that require precise delivery of control commands to a controlled device. However, implementing deterministic networking can include stringent deterministic constraints such as packet delivery within a prescribed latency, zero or near-zero jitter, high packet delivery ratios, etc.

The example embodiments ensure that even if transport layer packets are received at a destination host in a receive order that differs from the transmit order (for example due to the different deterministic links having different relative schedules and/or different latencies), the transport layer executed in the destination host can reorder the received transport layer packets from the received order into the transmit order based on the respective transport sequence identifiers within the received transport layer packets. The example embodiments also can be executed in an intermediate host device that can reorder the received transport layer packets from the received order into the transmit order, prior to retransmission on different deterministic links, for example if the intermediate host device receives the transport layer packets from first deterministic links in a first deterministic domain and causes retransmission in the transport order via second deterministic links in a second different deterministic domain (e.g., using different number of deterministic data links, different schedules, different management entity, etc.).

Existing transport mechanisms (e.g., Transmission Control Protocol, or "TCP") are incapable of providing deterministic transmission of a flow of data packets across multiple deterministic links because such transport mechanisms have constraints that are inconsistent with the requirements of a deterministic network. For example, deterministic networking (e.g., DetNet, TSN) relies on a fixed bandwidth or throughput for reliable delivery of data packets at a precise reception time; in contrast, TCP is configured for adapting to bandwidth variations in non-deterministic data networks by attempting to aggressively claim more bandwidth for data transmission until reaching a point where packet loss occurs, in response to which TCP will "throttle back" its use of bandwidth (e.g., the bandwidth utilization of TCP resembles a sawtooth wave) and retry transmission of the lost data packet after a timeout window. Hence, the variable bandwidth utilization of TCP conflicts with the fixed bandwidth of deterministic networking.

TCP also conflicts with the requirements of a deterministic network device receiving a data packet at a precisely-scheduled receive time, because TCP is configured for retransmitting a lost packet during a retry attempt after a timeout window; hence, any TCP-based retry attempt would be improper in deterministic networking because the retry attempt after the timeout window would be too late, i.e., substantially after the precisely-scheduled receive time.

Further, deterministic networking can establish stringent deterministic constraints based on defining a transmission schedule relative to: (1) a period of time "T"; (2) a maximum packet size "F"; and a maximum number of data packets "N" that can be transmitted on a deterministic link within the period of time "T". Hence, a deterministic network interface circuit can transmit on a deterministic link, at a scheduled transmission time within the period of time "T", a maximum number of "N" data packets having a maximum size "F"; in other words, a data packet exceeding size "F" is dropped (by the receiving deterministic network interface circuit) if transmitted on the deterministic link; further, if "N+1" packets are transmitted on the deterministic data link at the scheduled transmission time within the period of time "T", the first "N" packets would be accepted (by the receiving deterministic network interface circuit) and the "N+1" packet would be dropped. TCP does not provide for transmitting, at a scheduled transmission time within the period of time "T", a maximum number of "N" data packets having a maximum size "F".

Hence, example embodiments enable an executable application that generates a flow of application data to utilize multiple deterministic links (as opposed to relying on a single deterministic link such as a TSN link or AVB link, etc.), without the necessity of the executable application coordinating with a network manager that provides time-aware scheduling of the deterministic data links for enforcement of precise synchronization requirements according to prescribed Quality of Service (QoS) Service Level Agreements (SLA) within the deterministic network. As described below, the transport layer can determine a preferred (or optimized) size available on a deterministic link 18 (e.g., 75 kbps), and proactively request additional deterministic links 18 for deterministic transport of the transport layer packets according to the QoS requirements (e.g., 100 kbps) required by the flow of application data.

FIGS. 1A-1J illustrate one or more host devices 10, 10', each comprising a processor circuit 12 configured for executing a transport layer 14 for providing deterministic transport of transport layer packets 16 across multiple deterministic links 18 in an example deterministic data network 20, according to an example embodiment. The deterministic data network 20 of FIGS. 1A-1J is illustrated for simplicity as comprising two or more peer-to-peer TSN data links "TSN Link 1" 18 and "TSN Link 2" between deterministic network interface circuits 22, illustrated as a TSN "Line card 1" 22a, TSN "Line card 2" 22b, TSN "Line card 1" 22c, and TSN "Line card 1" 22d. The deterministic data network 20 also can include a network manager device 24 configured for controlling establishment of the deterministic links 18, by the deterministic network interface circuits 22, according to prescribed deterministic constraints established and maintained by the network manager device 24. In particular, the network manager device 24 can send instructions to each of the deterministic network interface circuits 22 for establishment of a deterministic link 18 with a peer deterministic network interface circuit 22 according to the above-described deterministic constraints, including for example a transmission time "t_TSN" according to a repeating schedule, a prescribed transmission period of time "T", and a maximum number of "N" data packets having a maximum size "F" that can be transmitted during the transmission time period "T". The network manager device 24 can cause the deterministic network interface circuits 22 to establish the deterministic links 18, for example as TSN links according to IEEE 802.1Qbv. The maximum size "F" can be established by the Service Level Agreement (SLA), in terms of the maximum packet size "F", and the maximum number of "N" data packets per unit time "T"; alternately, the SLA can specify a minimum delay between packets.

Figure 2:
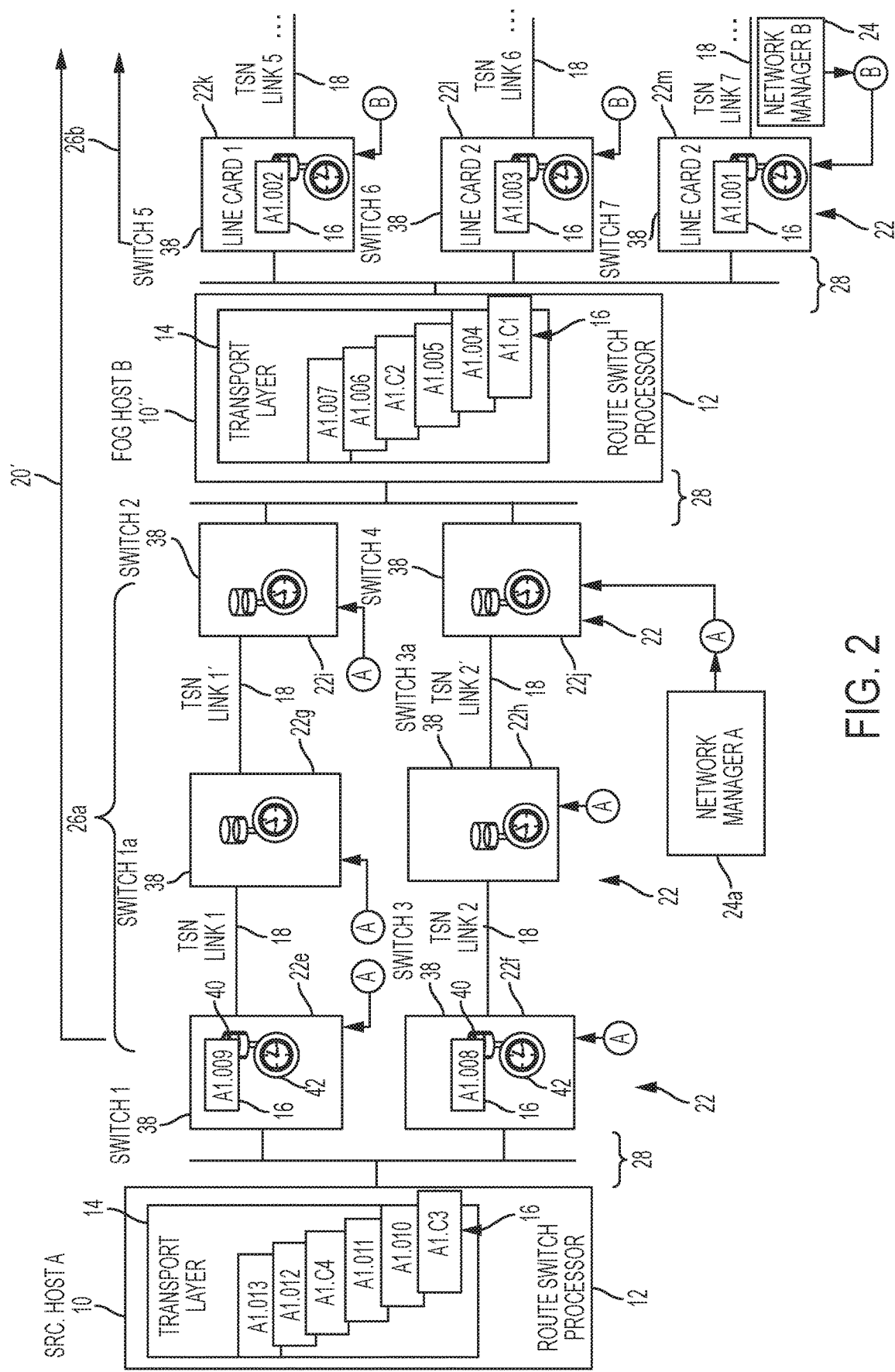
FIG. 2 illustrates a second example deterministic data network having an intermediate host device comprising an intermediate transport layer providing deterministic transport of transport layer packets between deterministic links of different distinct deterministic domains, according to an example embodiment.

The deterministic data network 20 also can be implemented as shown FIG. 2, which illustrates a second example deterministic data network 20'. The deterministic data network 20' can include a plurality of deterministic network interface circuits 22 (22e through 22m) implemented within one or more switching devices 38, implemented for example as a commercially-available Cisco® Industrial Ethernet (IE) 4000 Series and/or IE 5000 Series Switch from Cisco Systems, San Jose, Calif. The deterministic data network 20' also includes a first network manager device 24a configured for establishing the deterministic links 18 within a first deterministic domain 26a based on deterministic constraints established by the network manager device 24a and sent to each of the deterministic network interface circuits 22 (e.g., 22e through 22j) establishing the deterministic links 18 in the deterministic domain 26a. As illustrated in FIG. 2, the source host device 10 can be coupled to the deterministic network interface circuits 22e and 22f via a Top-of-Rack (TOR) Switch 28, implemented for example as a commercially-available Cisco® Catalyst 4900 Series Switch from Cisco Systems, San Jose, Calif. Hence, the source host device 10, the TOR switching device 28, and the deterministic network interface circuits 22e and 22f can be implemented within a single rack mount, for example within a data center or within an industrial network.

The deterministic data network 20' also can include a second network manager device 24b configured for establishing the deterministic links 18 within a second deterministic domain 26b based on second different deterministic constraints established by the network manager device 24b and sent to each of the deterministic network interface circuits 22 (e.g., 22k, 22l, 22m, etc.) establishing the deterministic links 18 in the deterministic domain 26b.

Although not shown in FIG. 2, the deterministic domain 26b of the deterministic data network 20 continues with peer deterministic network interface circuits 22 receiving the transport layer packets 16 deterministically transmitted by the switching devices "5", "6", and "7" containing the respective deterministic network interface circuits 22k, 22l, and 22m.

FIG. 2 also illustrates that the deterministic data network 20' includes an intermediate host device 10" that can deterministically reorder the transport layer packets 16 between the deterministic domain 26a and deterministic domain 26b, based on transport sequence identifiers within the received transport layer packets 16, described in further detail below.

As illustrated in FIG. 1A and FIG. 2 and described in further detail below, the transport layer 14 executed by the processor circuit 12 in the source host device 10 is configured for receiving a flow of application data originated by an executable application (34 of FIG. 3): the transport layer 14 executed in the source host device 10 is configured for generating transport layer packets 16 that contain one or more portions of the application data; the transport layer 14 also is configured for generating and inserting into each transport layer packet 16 a corresponding transport sequence identifier 30 that uniquely identifies a corresponding position of the transport layer packet 16 relative to a transport order of the transport layer packets 16. The transport layer 14 also can generate and insert into each transport layer packet 16 a transport flow identifier (e.g., "A1") 32 associated with the flow of application data from the executable application (34 of FIG. 3). The transport layer 14 can generate each transport layer packet 16 according to the deterministic constraints established by the network manager device 24, for example generating within a period of time "T" no more than the maximum number of data packets "N" each having no more than a maximum packet size "F" (minus any data link layer header information added by a deterministic network interface circuit 22, described below).

Hence, the transport layer 14 executed in the source host device 10 (also referred to herein as the "source transport layer") can generate a sequence of transport layer packets 16, containing the flow of application data, according to the deterministic constraints established by the network manager device 24, and where each transport layer packet 16 specifies a corresponding transport sequence identifier 30. As described in further detail below, the transport layer 14 also can cause the transmitting deterministic network interface circuits 22 (e.g., 22a and/or 22b of FIGS. 1A-1G; 22e and/or 22f of FIGS. 1H-1J and/or FIG. 2) to deterministically retrieve the transport layer packets 16, in the transmit order, from a transmit buffer circuit (e.g., 36 of FIG. 3) for deterministic transmission across the respective deterministic links 18.

As illustrated in FIG. 2, the source transport layer 14 also can generate coded packets (e.g., "A1.C1", "A1.C2", "A1.C3", "A1.C4", etc.) associated with the transport layer packets 16, and insert the coded packets into the transport layer transmit buffer circuit 36 for error-protected transmission of the transport layer packets 16. For example the source transport layer 14 can generate the coded packet "A1.C1" as a "1+1" network-coded result of the transport layer packets "A1.004" and "A1.005", enabling a destination to recover the transport layer packet "A1.004" using the transport layer packet "A1.005" and the coded packet "A1.C1". The coded packet (e.g., "A1.C1") can be queued for transmission before the associated protected transport layer packets (e.g., "A1.004" and "A1.005"), enabling immediate recovery if one of the protected transport layer packets is lost.

As illustrated in FIGS. 1A and 2, each deterministic network interface circuit 22 comprises a transmit/receive buffer circuit 40 and a transmit/receive gate circuit 42. The transmit/receive buffer circuit 40 (e.g., in the deterministic network interface circuits 22a, 22b, 22e, 22f, 22g, 22h, and 22k-22m) is configured for storing "transmit" data to be transmitted by the corresponding transmit/receive gate circuit 42 as a link layer data packet (e.g., 44a of FIG. 1B) according to the deterministic constraints established by the network manager device 24; the transmit/receive buffer circuit 40 also can be configured (e.g., in the deterministic network interface circuits 22c, 22d, 22g, 22h, 22i, 22j) for storing "receive" data as the link layer data packet (e.g., 44a of FIG. 1B) is received by the corresponding transmit/receive gate circuit 42 according to the deterministic constraints established by the network manager device 24. Alternately, the transmit/receive buffer circuit 40 can be implemented based on separating the transmit buffer circuit from the corresponding receive buffer circuit, and the transmit/receive gate circuit 42 can be implemented based on separating the transmit gate circuit from the corresponding receive gate circuit.

Hence, the transport layer 14 in the source host device 10 can cause any one of the deterministic network interface circuits 22a and/or 22b to deterministically retrieve a transport layer 14 from the transport layer transmit buffer circuit 36, described in further detail below with respect to FIGS. 4A and 4B. Each transmitting deterministic network interface circuit 22, however, controls the actual time instance that it deterministically fetches the next transport layer packet 16 from the transport layer transmit buffer circuit 36, without the knowledge or control of the transport layer 14. In particular, while the transport layer 14 causes the deterministic retrieval of the transport layer packets 16 from the transport layer transmit buffer circuit 36 (e.g., based on deciding multiple deterministic network interface circuits 22 are needed for deterministic transport of the transport layer packets 16, establishing at least a portion of the deterministic network parameters required for pre-fetching the transport layer packet 16 before the next transmission instance, triggering the deterministic network interface circuits 22 when to begin the process of fetching the transport layer packets 16, etc.), the transport layer 14 is not necessarily part of the deterministic data network 20, and therefore is not aware of the precise transmission instance executed by any of the transmitting deterministic network interface circuits 22. Hence, while the transport layer 14 can cause the deterministic retrieval of the transport layer packets 16 by the deterministic network interface circuits 22, the actual retrieval of a transport layer packet 16 is initiated by a deterministic network interface circuit 22 and not the transport layer 14.

Figure 3:
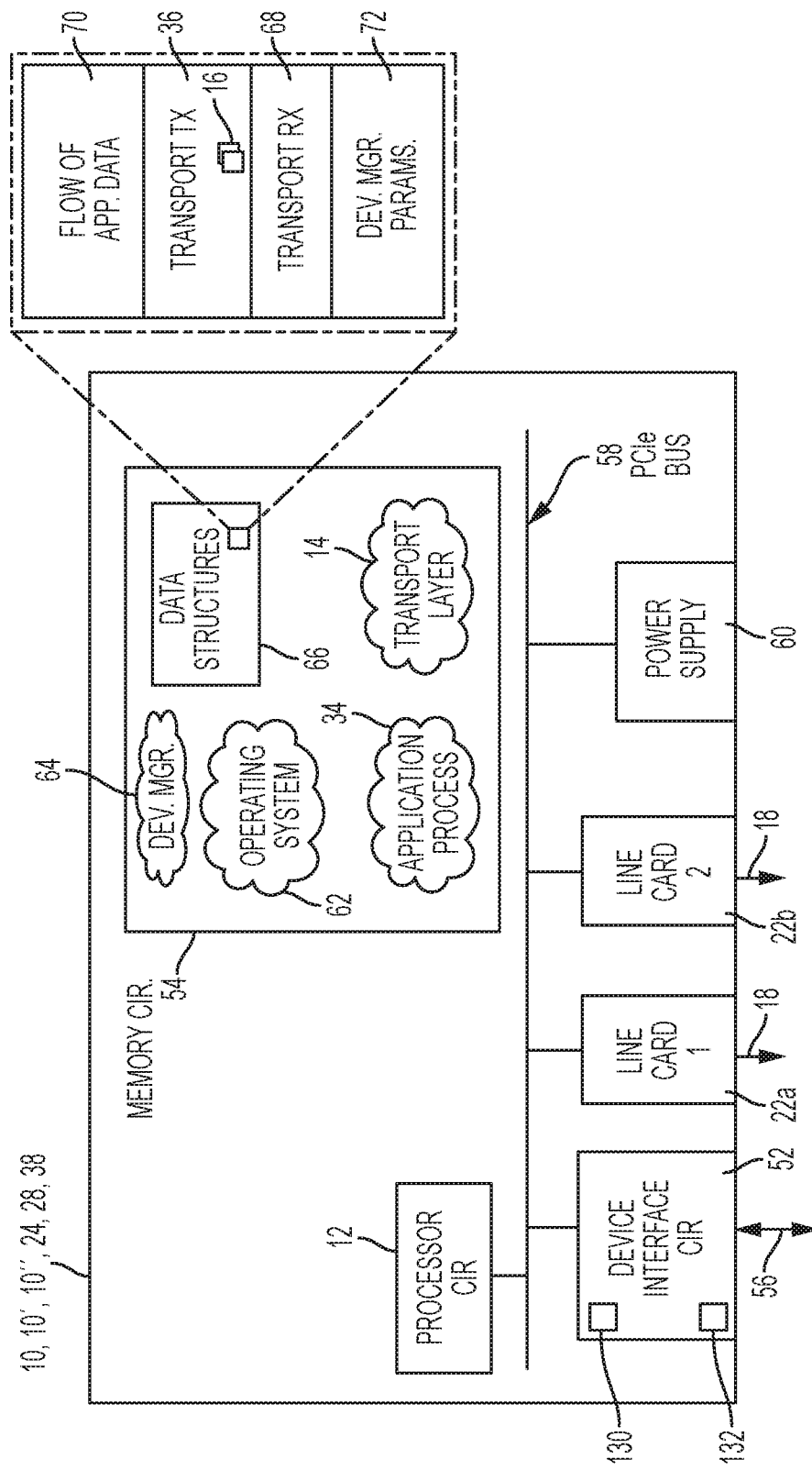
FIG. 3 illustrates an example implementation of any one of the devices of FIGS. 1 and/or 2, according to an example embodiment.

Hence, as illustrated in FIG. 1A, the deterministic network interface circuit 22*b* can deterministically retrieve (from the transport layer transmit buffer circuit 36 illustrated in FIG. 3) the transport layer packet 16 having the transport sequence identifier "001" 30 at a first time instance (126 of FIG. 5) that precedes its corresponding transmission instance (84 of FIG. 5) on the "TSN Link 2" 18 (without knowledge or control by the transport layer 14 in the source host device 10), whereas the deterministic network interface circuit 22*a* can deterministically retrieve from the transport layer transmit buffer circuit 36 the next transport layer packet 16 having the transport sequence identifier "002" 30 (without knowledge or control by the transport layer 14 in the source host device 10). As described in further detail below, the transport sequence identifiers 30 in the transport layer packets 16 enable a next receiving transport layer such as a destination transport layer 14 (e.g., within the destination host device 10') to recover the transmit order established by the transport layer 14 in the source host device 10, following the deterministic transmission across the deterministic links 18, regardless of order of reception thereof by the destination transport layer 14 in the destination host device 10' or the intermediate host device 10".

FIG. 3 illustrates an example implementation of any one of the devices 10, 10', 10", 24, 28, and/or 38 of FIGS. 1A-1J and/or FIG. 2, according to an example embodiment. Each apparatus 10, 10', 10", 24, 28, and/or 38 is a physical machine (i.e., a hardware device) configured for implementing network communications with other physical machines via the deterministic data network 20, 20', and/or another data network (e.g., a local area network (LAN) and/or a Wide Area Network (WAN) such as the Internet). The term "configured for" or "configured to" as used herein with respect to a specified operation refers to a device and/or machine that is physically constructed and arranged to perform the specified operation. Depending on implementation, each device 10, 10', 10", 24, 28, and/or 38 can include a processor circuit 12, a device interface circuit 52 and/or 22, a memory circuit 54 interconnected by a system bus (e.g., PCI Express (PCIe)) 58, and a power supply 60 (e.g., battery, plug-in, etc.).

The device interface circuit 22 and/or 54 can include mechanical, electrical, and signaling circuitry for communicating data with other device interface circuits 22 and/or 54; for example, each device interface circuit 22 and/or 54 can include one or more distinct physical layer transceivers for communication with any one of the other devices of FIG. 1 or 2 as described herein; for example, the device interface circuit 52 can be implemented as a ten Gigabit (10 GB) Ethernet (10GBASE-T) link layer transceiver configured for establishing a data link 56 with any one of the 10, 10', 10", 24, 28, and/or 38 via a non-deterministic data connection (not shown); for example, the non-deterministic data connection could exist within the physical data network (e.g., LAN and/or WAN) that is used to deploy the deterministic data network 20 or deterministic data network 20', where data links that are having unreserved (i.e., "free") intervals that are not reserved for deterministic transport can be used for non-deterministic data connections. Alternately, one or more of the 10, 10', 10", 24, 28, and/or 38 (e.g., the host devices 10, 10' and/or 10") can include both the device interface circuit 52 for non-deterministic communications (e.g., with the network manager device 24) and plural deterministic network interface circuits 22 for deterministic communications as described herein.

Any one of the devices 10, 10', 10", 24, 28, and/or 38 also can be configured for a different type of deterministic link 18 or data link 56, as appropriate (e.g., a wired or wireless link, an optical link, etc.).

The processor circuit 12 can be configured for executing any of the operations described herein, and the memory circuit 54 can be configured for storing any data or data packets as described herein. For example, the processor circuit 12 and the memory circuit 54 implemented in the source host device 10, 10', 10" or the network manager device 24 can have a different implementation than the processor circuit 12 and memory circuit 54 implemented in any one of the deterministic network interface circuits 22, the TOR switching device 28, and/or the switching device 38. The processor circuit 12 can be implemented as any one of a microprocessor circuit, a multi-core processor circuit, an application-specific integrated circuit (ASIC), etc.

Any of the disclosed circuits of the devices 10, 10', 10", 24, 28, and/or 38 (including the device interface circuit 22 or 52, the processor circuit 12, the memory circuit 54, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as one or more application-specific integrated circuits (ASICs). Any of these circuits also can be implemented using a software-based executable resource that is loaded into the apparatus (e.g., via a device interface circuit such as an Ethernet connector, a Universal Serial Bus (USB) device, or some other machine-readable medium interface such as a CD-ROM drive) and executed by a corresponding internal processor circuit such as a microprocessor circuit (not shown) and implemented using one or more integrated circuits, where execution of executable code stored in an internal memory circuit (e.g., within the memory circuit 54) causes the integrated circuit(s) implementing the processor circuit to store application state variables in processor memory, creating an executable application resource (e.g., an application instance) that performs the operations of the circuit as described herein. For example, the memory circuit 54 can be configured for storing application state variables for a transport layer process 14, an executable application process 34, an operating system process 62, and/or a device manager process 64; in some cases certain processes can be combined, for example the transport layer process 14 and the device manager process 64 can be combined within the operating system process 62. Example data structures 66 stored in the memory circuit 54 can include the transport layer transmit buffer circuit 36 storing the transport layer packets 16 awaiting retrieval by the deterministic network interface circuits 22, a transport layer receive buffer circuit 68 configured for storing received transport layer packets 16 from a receiving deterministic network interface circuit 22 (e.g., 22*c*, 22*d*, 22*i*, 22*j*), an identified flow of application data 70 generated by the executable application 34, device manager parameters 72 including line card allocation parameters and associated deterministic constraints established for deterministic transmission by the deterministic network interface circuit 22a and/or 22b, etc.

Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 54 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 54 can be implemented dynamically by the processor circuit 12, for example based on memory address assignment and partitioning executed by the processor circuit 12.

Figure 4A:
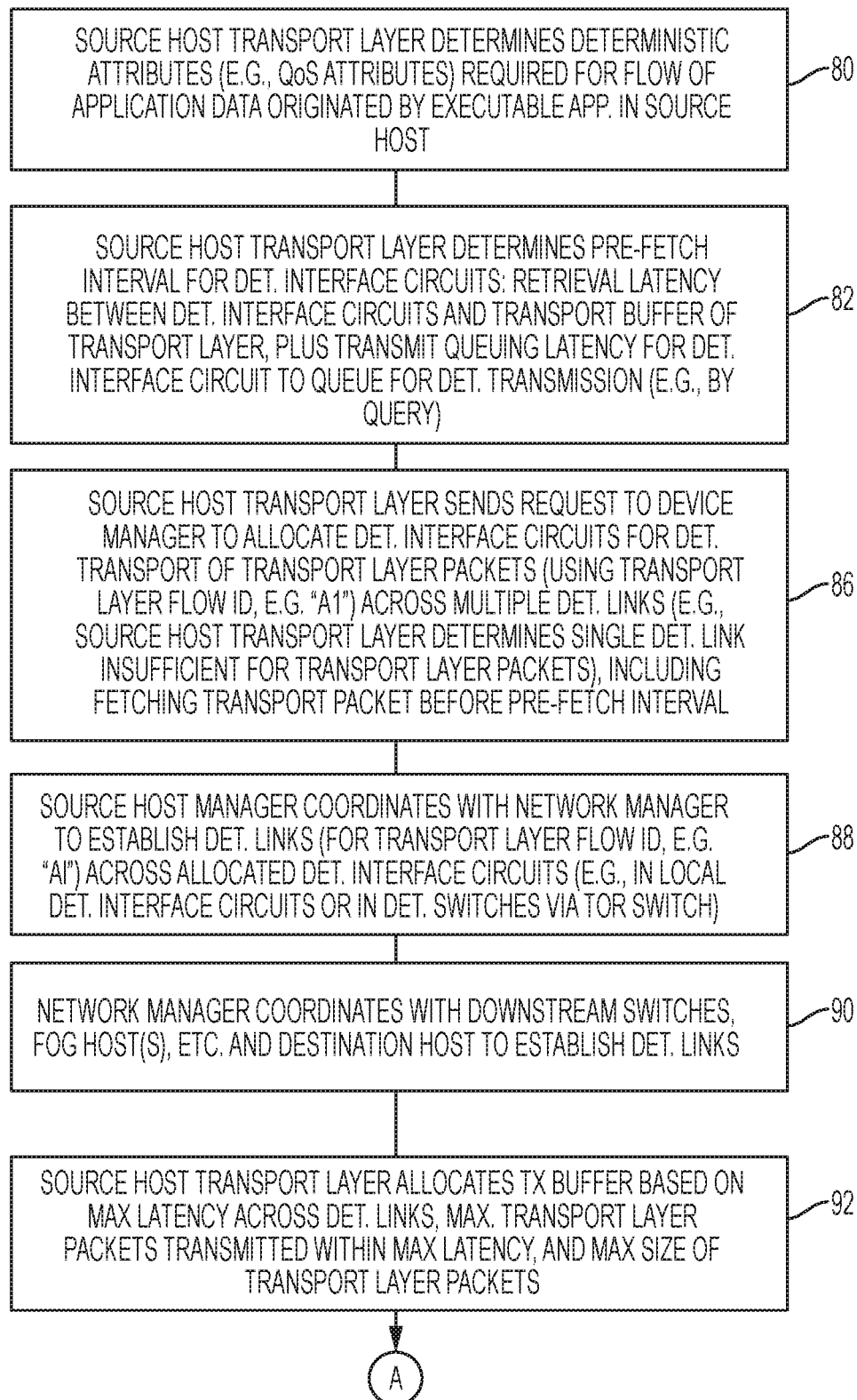
FIGS. 4A-4C illustrate an example method of a transport layer providing deterministic transport of transport layer packets across multiple deterministic links, according to an example embodiment.
Figure 4B:
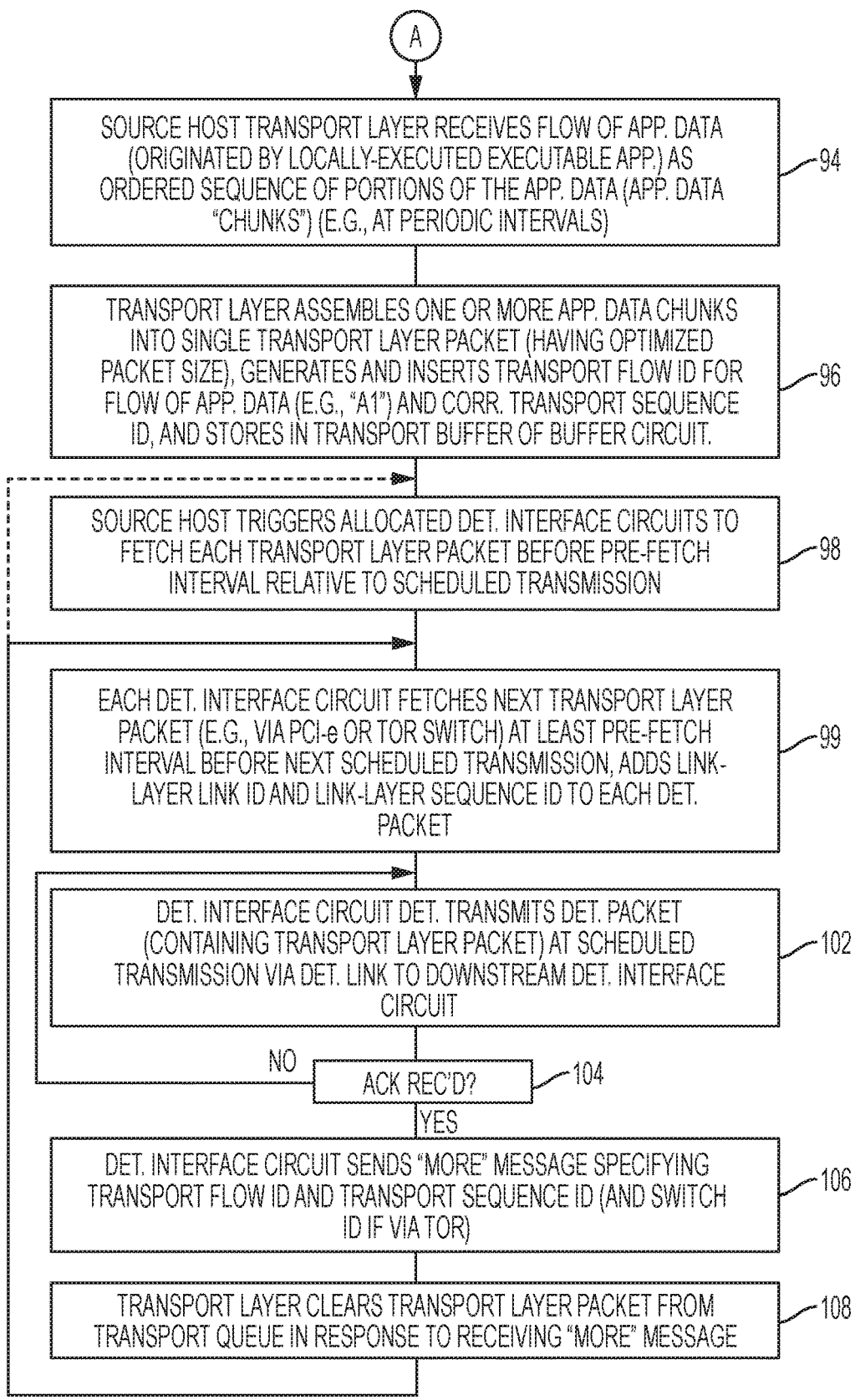
Figure 4C:
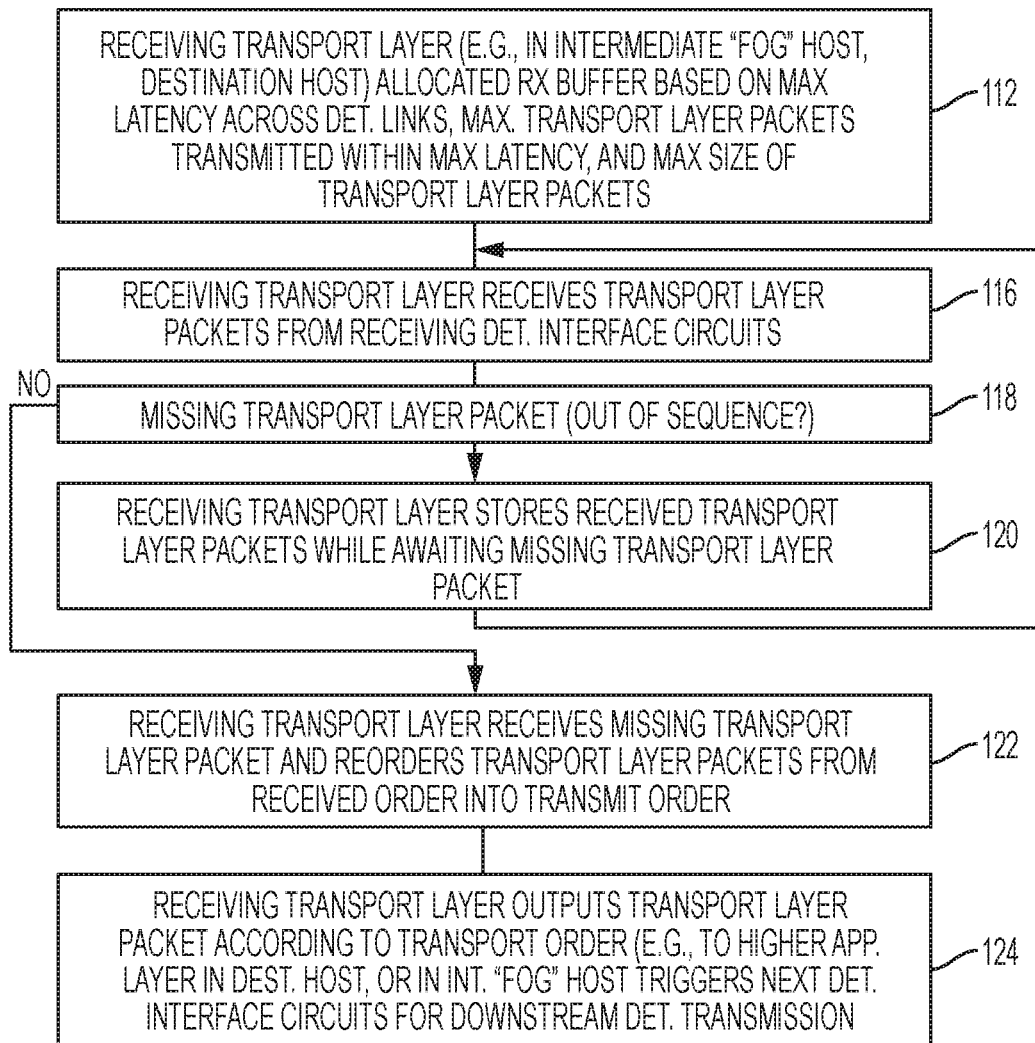

FIGS. 4A-4C illustrate an example method of a transport layer providing deterministic transport of transport layer packets across multiple deterministic links, according to an example embodiment.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

Referring to FIG. 4A, the processor circuit 12 executing the source host transport layer 14 in the source host device 10 is configured for determining in operation 80 the deterministic attributes and/or constraints that are required for an identified flow of application data 70 originated by the executable application 34 in the source host device 10. Example deterministic attributes can include identifying the destination host device 10' (e.g., by host name and/or Internet Protocol (IP) address, etc.), identifying a minimum Quality of Service (QoS) required for packet delivery at the destination host device 10', expressed for example as a prescribed minimum bandwidth, an overall jitter below a prescribed maximum jitter variation, a packet delivery ratio, a latency below a prescribed maximum latency, etc. The transport layer 14 (executed by the processor circuit 12 in the source host device 10) also can have access to available deterministic attributes of one or more deterministic links 18 established by a deterministic network interface circuit 22.

Figure 5:
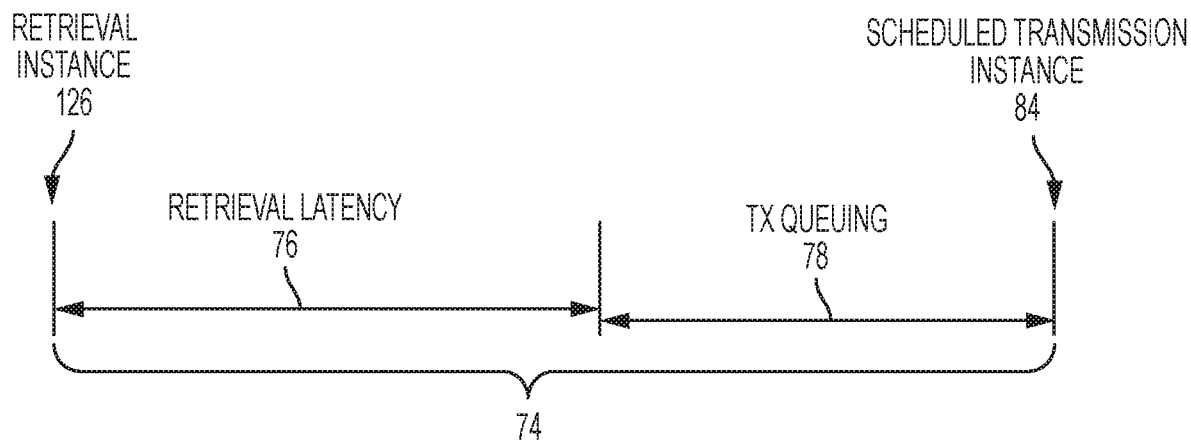
FIG. 5 illustrates an example pre-fetch interval, determined by the transport layer of FIGS. 1 and/or 2, for deterministic retrieval of each transport layer packet by a deterministic network interface circuit, according to an example embodiment.

The transport layer 14 (executed by the processor circuit 12 in the source host device 10) in operation 82 also can determine for each deterministic network interface circuit 22 a pre-fetch interval (74 of FIG. 5) for each deterministic network interface circuit 22 coupled to the source host device 10 for deterministic transmission of transport layer packets 16. As illustrated in FIG. 5, the transport layer 14 can determine a retrieval latency 76 for a corresponding deterministic network interface (e.g., 22a, 22b, 22e, and/or 22f) to retrieve the corresponding transport layer packet 16 from the transport layer transmit buffer circuit 36, and a transmit queuing latency 78 for the corresponding deterministic network interface (e.g., 22a, 22b, 22e, and/or 22f) to queue the corresponding transport layer packet for the corresponding deterministic transmission at the scheduled transmission instance 84. The transport layer 14 can determine the transmit queuing latency 78, for example based on a query to the corresponding deterministic network interface circuit 22, and/or by accessing the pre-fetch interval 74 from the device manager parameters 72 stored in the local memory circuit 54.

Hence, the transport layer 14 (executed by the processor circuit 12 in the source host device 10) can cause each deterministic network interface circuit 22 associated with the source host device 10 to deterministically retrieve, at a corresponding retrieval instance 126, each transport layer packet 16 from the transport layer transmit buffer circuit 36 by the pre-fetch interval 74 preceding the corresponding deterministic transmission at the scheduled transmission instance 84, based on determining in operation 82 the corresponding pre-fetch interval 74, and sending in operation 86 a request to the device manager 64 to allocate a plurality of deterministic network interface circuits 22 (e.g., 22a and 22b, or 22e and 22f, etc.) for deterministic transport of the transport layer packets 16 (using the transport flow identifier "A1" 32) according to the deterministic attributes required for the identified flow of application data 70. As described below, each deterministic network interface circuit 22 can initiate retrieval of a transport layer packet by generating and outputting a "more" message 100 at the corresponding retrieval instance 126; in other words, each deterministic network interface circuit can define initiation of the next retrieval instance 126 by transmission of the "more" message 100.

The transport layer 14 in operation 86 also can determine that a single one of the deterministic links 18 has insufficient resources for deterministic transport of the transport layer packets 16 to the destination transport layer 14 (executed in the source host device 10 or the intermediate host device 10"), and in response the transport layer packet 16 can specify in the request to the device manager 64 that multiple deterministic network interface circuits 22 are required for the deterministic transport of the transport layer packets 16.

The device manager 64 executed by the processor circuit 12 in the source host device 10 (i.e., the source host manager) in operation 88 can coordinate with the network manager device 24 (and/or 24a and 24b of FIG. 2, as appropriate), for establishment of end-to-end deterministic links 18 for the transport layer packet 16 from the source host device 10 to the destination host device 10' via the deterministic data network 20 (or the deterministic data network 20' of FIG. 2). The network manager device 24 (and/or 24a and 24b of FIG. 2) in operation 90 can coordinate with the downstream switching devices 38, any intermediate host device 10" (as appropriate), and the destination host device 10', for establishment of the plural deterministic links 18 for end-to-end deterministic transmission via the deterministic links 18 of the transport layer packets 16 from the source host device 10 to the destination host device 10', according to the required deterministic constraints. For example, the network manager device 24a of FIG. 2 can send instructions to the deterministic network interface circuits 22e, 22g, and 22i for the establishment in the deterministic domain 26a of a first deterministic path (comprising "TSN link 1" 18 and "TSN link 1'" 18) having first deterministic constraints for the transport layer packets 16 having the transport flow identifier "A1" 32; the network manager device 24a of FIG. 2 also can send instructions to the deterministic network interface circuits 22f, 22h, and 22j for the establishment in the deterministic domain 26a of a second deterministic path (comprising "TSN link 2" 18 and "TSN link 2'" 18) having second different deterministic constraints for the transport layer packets 16 having the transport flow identifier "A1" 32. The network manager device 24a also can notify the intermediate host device 10" of the first and second deterministic paths for the transport layer packets 16 having the transport flow identifier "A1" 32. As apparent from the foregoing, the device manager 64 in the intermediate host device 10" can coordinate with the network manager device 24b to establish deterministic paths in the deterministic domain 26b; alternately, the network manager device 24a and network manager device 24b can communicate to establish the deterministic transport of the transport layer packets 16 across the respective deterministic domains 26a and 26b via the intermediate host device 10".

The network manager device 24 in operation 90 also can send an acknowledgement to the device manager 64 specifying the plural deterministic links 18 are established for the transport layer packets 16 identified by the transport sequence identifier "A1" 30, including for example for each identified deterministic network interface circuit 22 the prescribed transmission period of time "T", the maximum number of "N" data packets having a maximum size "F" that can be transmitted during the transmission time period "T", and the repeat interval for the repeating schedule. The device manager 64 executed in the source host device 10 can notify the transport layer 14 of the identified deterministic network interface circuits 22 and the supplied parameters (note that the transport layer 14 need not be aware of the actual scheduled starting transmission time "t_TSN" 84).

The transport layer 14 executed in the source host device 10 in operation 92 also can allocate the size of the transport layer transmit buffer circuit 36 in the memory circuit 54 based on determining the maximum latency interval (L_MAX) across the deterministic links 16 from the source host device 10 to the "next" transport host (e.g., the intermediate host device 10" or the destination host device 10'), the maximum number of transport layer packets 16 that can be transmitted within the maximum latency, and the maximum size "F" of the transport layer packets 16. The maximum latency interval (L_MAX) across the deterministic links refers to the maximum time interval that may be needed for the transport layer 14 in the destination host device 10' to recover if an out-of-sequence packet is lost during transmission, as the source transport layer 14 executed in the source host device 10 does not specifically control which transport layer packet 16 a deterministic network interface circuit 22 should retrieve from the transport layer transmit buffer circuit 36, nor does the source transport layer 14 specifically control the scheduled transmission 84 by the transmit/receive gate circuit 42 of a given deterministic network interface circuit 22. Hence, the maximum latency interval (L_MAX) refers to the maximum amount of time a transport layer 14 must store successive transport layer packets 16 (i.e., having adjacent transport sequence identifiers 30) in case the different transport layer packets 16 are out of order and an out-of-order transport layer packet 16 needs to be reordered and/or retransmitted (if permitted according to the link-layer protocol executed by the deterministic link 18).

As described in further detail below, in FIG. 1A the deterministic network interface circuit 22b deterministically retrieves the transport layer packet 16 having the transport sequence identifier "001" 30 and stores in its transmit/receive buffer circuit 40 to await deterministic transmission at its next scheduled transmission opportunity, and the deterministic network interface circuit 22a deterministically retrieves the transport layer packet 16 having the transport sequence identifier "002" 30; in FIG. 1B the deterministic network interface circuit 22a deterministically transmits at event "t=t1" 46b the link layer data packet 44a containing the transport layer packet 16 having the transport sequence identifier "002" 30 while the deterministic network interface circuit 22b waits for its next scheduled transmission opportunity (at event "t=t4" 46e of FIG. 1E) before it can transmit the transport layer packet 16 having the transport sequence identifier "001" 30; hence, the maximum latency interval (L_MAX) is the maximum time the transport layer 14 in the source host device 10 must wait before it can clear a retrieved transport layer 14 from its queue (L_MAX=t4−t0). Hence, the transport layer 14 in operation 92 can be configured for allocating the size of the transport layer transmit buffer circuit 36 in the memory circuit 54 based on determining the maximum latency interval (L_MAX) across all the allocated deterministic links 18 for the identified flow "A1" 32, the maximum number of transport layer packets 16 that can be transmitted across all the allocated deterministic links 18 during the maximum latency, and the maximum size "F" of the transport layer packets 16. Similar allocations can be performed by the transport layer 14 for the transport layer receive buffer circuit 68, described below, for storage of received transport layer packets 16 while awaiting other transport layer packets 16 for reordering into the proper transmit sequence according to the transport sequence identifier 30.

Referring to FIG. 4B, the transport layer 14 executed in the source host device 10 in operation 94 receives the flow of application data packets 70 originated by the executable application 34; for example, the transport layer 14 can receive an alert (e.g., metadata, a descriptor, etc.) indicating the storage of the identified flow of application data 70 by the executable application 34 in the memory circuit 54, enabling the transport layer 14 to fetch an ordered sequence of the portions of the application data (e.g., as application data "chunks") from the memory circuit 54. Alternately, the executable application 34 and/or the operating system 62 can supply the identified flow of application data 70 as a data flow to the transport layer 14, for example where the transport layer 14 is executed in a hardware circuit that is distinct from the executable application 34 (e.g., multi-core processor, distinct ASICs, etc.). The transport layer 14 can receive the identified flow of application data 70 as a block of stored application data, an application data burst, a steady stream of application data "chunks", etc. Hence, the transport layer 14 can receive the flow of application data 70 as a sequence of portions of the application data from the executable application 34 executed locally by the processor circuit 12.

The transport layer 14 executed in the source host device 10 in operation 96 is configured for assembling one or more application data chunks into a single transport layer packet 16 having an optimized packet size based on the maximum size "F" determined for the deterministic links 18. The transport layer 14 in operation 96 also can generate a transport flow identifier (e.g., "A1") 32 associated with the identified flow of application data 70, for example to distinguish from another application flow generated by the same executable application (e.g., for a different destination, different content type, different sensor source, etc.). The transport layer 14 in operation 96 also can maintain a sequence counter for the identified flow of application data "A1" 70 for tracking the sequence of the transport layer packets 16 to be transported across the deterministic links 18. The transport layer 14 in operation 96 inserts the transport flow identifier 32 and the corresponding transport sequence identifier 30 into the transport layer packet 16, and stores the generated transport layer packet 16 into the transport layer transmit buffer circuit 36. As described previously, the transport sequence identifier 30 enables a receiving transport layer 14 (e.g., executed in the destination host device 10' or an intermediate host device 10") to reorder any received transport layer packets 16 into the appropriate transmit order to correct any mis-ordering due to different transmission schedules, different latencies, link layer transmission parameters, etc., across the deterministic links 18.

The transport layer 14 executed in the source host device 10 in operation 98 optionally can send a trigger message to the allocated deterministic network interface circuits 22 (e.g., 22*a*, 22*b* of FIGS. 1A-1G; 22*e*, 22*f* of FIGS. 1H-1J and FIG. 2) indicating the availability of the transport layer packets 16 for the identified flow of application data. Each deterministic network interface circuit 22 can respond to the trigger message by deterministically retrieving a corresponding transport layer packet 16, in the transmit order, from the transport layer transmit buffer circuit 36 no later than the retrieval instance 126, i.e., initiating retrieval by at least the pre-fetch interval 74 before the next scheduled transmission instance 84 by the transmit/receive gate circuit 42 for the corresponding deterministic network interface circuit 22. Hence, any one or more of the operations 80, 82, 86, 88, 90, 92, 94, 96, and/or 98 by the transport layer 14 cause the deterministic network interface circuit 22 to deterministically retrieve the transport layer packets 16, in the transmit order, for deterministic transmission across the respective deterministic links 18.

Each deterministic network interface circuit 22 in operation 99 can deterministically fetch the next transport layer packet 16 by fetching the transport layer packet 16 by at least the pre-fetch interval 74 before the next scheduled transmission instance 84 based on generating and outputting a "more" message 100, described in further detail below with respect to FIG. 1B. As illustrated with respect to FIGS. 1A-1G, the deterministic network interface circuits 22*a* and 22*b* can fetch the next transport layer packet 14 via the system bus 58 (e.g., using the "more" message 100 for executing a memory-read operation from an identified location in the memory circuit 54; alternately with respect to FIGS. 1H-1J and FIG. 2, the deterministic network interface circuits 22*e* and 22*f* can fetch the next transport layer packet 16 via the TOR switching device 28 and the data link 56; the device interface circuit 52 executed in the source host device 10 of FIGS. 1H-1J and FIG. 2 can retrieve the next transport layer packet 16 from the transport layer transmit buffer circuit 36 on behalf of the deterministic network interface circuits 22*e* and 22*f* (e.g., the "more" message 100 requesting a remote memory read operation of the memory circuit 54 by the deterministic network interface circuits 22*e* and 22*f*, or the "more" message 100 requesting that the device interface circuit 52 and/or the processor circuit 12 fetches the next transport layer packet 16 as a message-initiated host transfer).

Hence, each "more" message 100 output by a deterministic network interface circuit 22 defines or establishes the next corresponding retrieval instance 126. The "more" message 100 can be implemented as one of a remote memory read request (enabling the deterministic network interface circuit 22 to directly fetch the next transport layer packet 16 from the transport layer transmit buffer circuit 36 in the memory circuit 54), and/or the "more" message 100 can be implemented as a message-initiated host transfer request that causes the device interface circuit 52/and/or the processor circuit 12 to fetch the next transport layer packet 16, from the transport layer transmit buffer circuit 36, on behalf of the deterministic network interface circuit 22; alternately, the message-initiated host transfer can include the transport layer 14 (executed by the processor circuit 12) storing in advance different transport layer packets 16 in a buffer circuit in the device interface circuit 52, enabling the device interface circuit 52 to output the next transport layer packet 16, from its internal buffer circuit, in response to a received "more" message 100 via the data link 56. As apparent from the foregoing, execution of the "more" message 100 at the retrieval instance 126 as a remote memory read request can minimize the retrieval latency 76 since the hardware associated with the deterministic network interface circuit 22 is used to access the memory circuit 54 of the source host device 10; execution of the "more" message 100 at the retrieval instance 126 as a message-initiated host transfer request may provide more security for the source host device 10 (by limiting access to the memory circuit 54), but can increase the retrieval latency 76 based on competing resource requirements in the processor circuit 12 and/or the device interface circuit 52.

Each deterministic network interface circuit 22 (e.g., 22*a*, 22*b*, 22*e*, 22*f*) in operation 99 also can add its own link-layer stream identifier 48 and link-layer sequence identifier 50 to each link layer data packet 44 prior to queuing in its corresponding transmit/receive buffer circuit 40. Hence, the transmit/receive gate circuit 42 in each deterministic network interface circuit 22 waits for its next corresponding scheduled transmission instance 84 before transmitting the link layer data packet 44 stored in its transmit/receive buffer circuit 40. As described previously, each scheduled transmission instance 84 is established by the network manager device 24 as part of the deterministic sequence of transmissions, for example according to TSN, AVB, DetNet, etc.

Figure 1B:
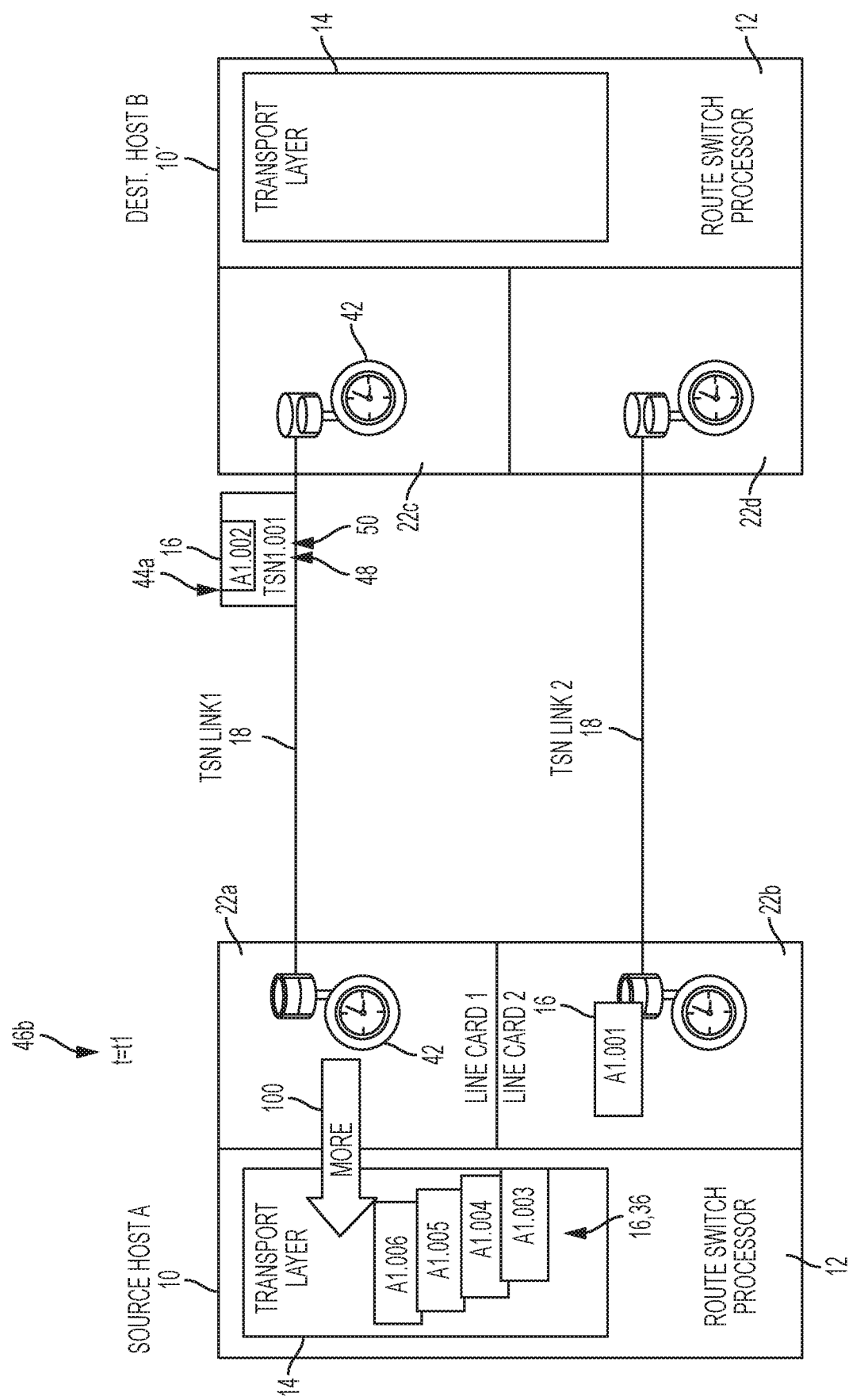
Figure 1C:
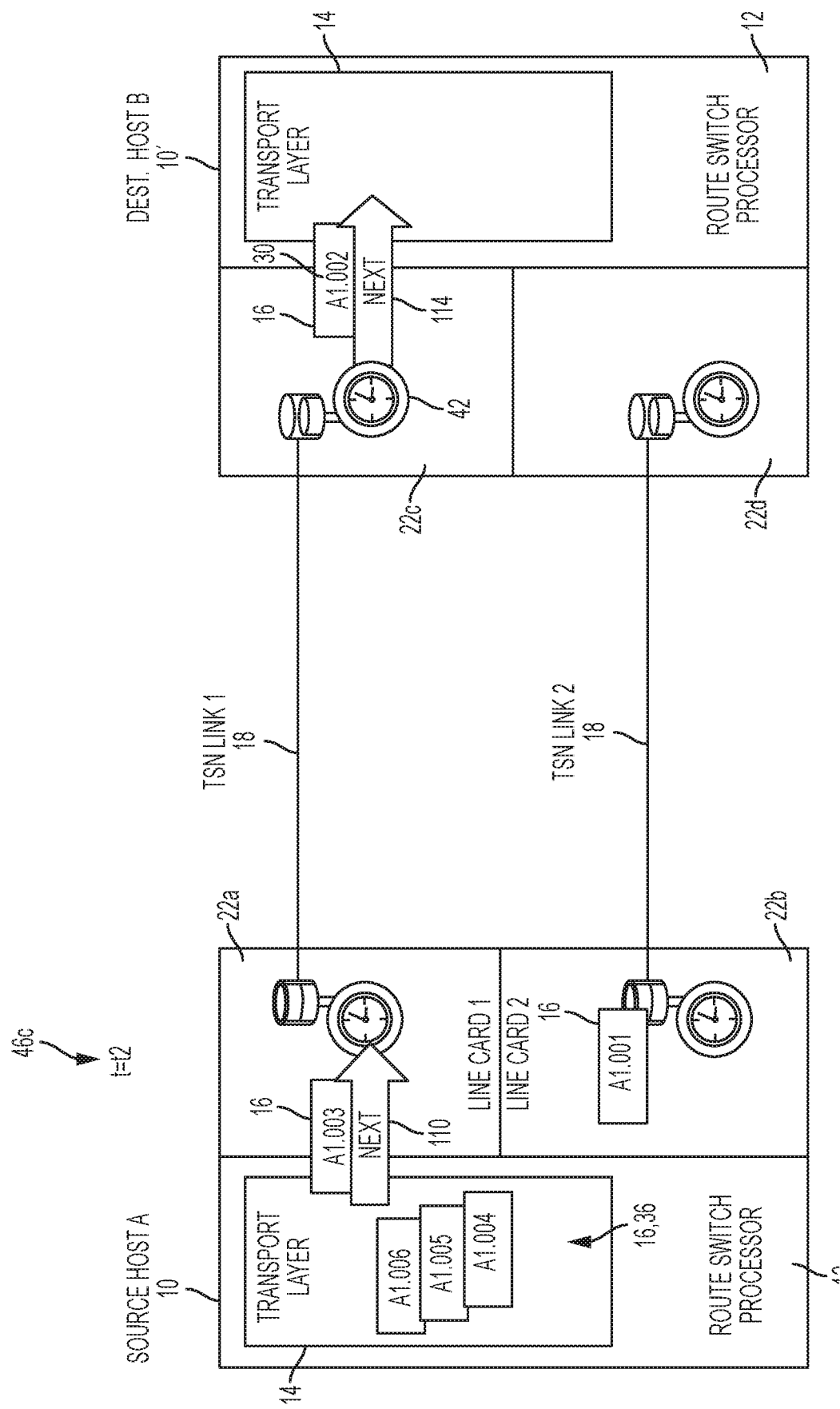
Figure 1D:
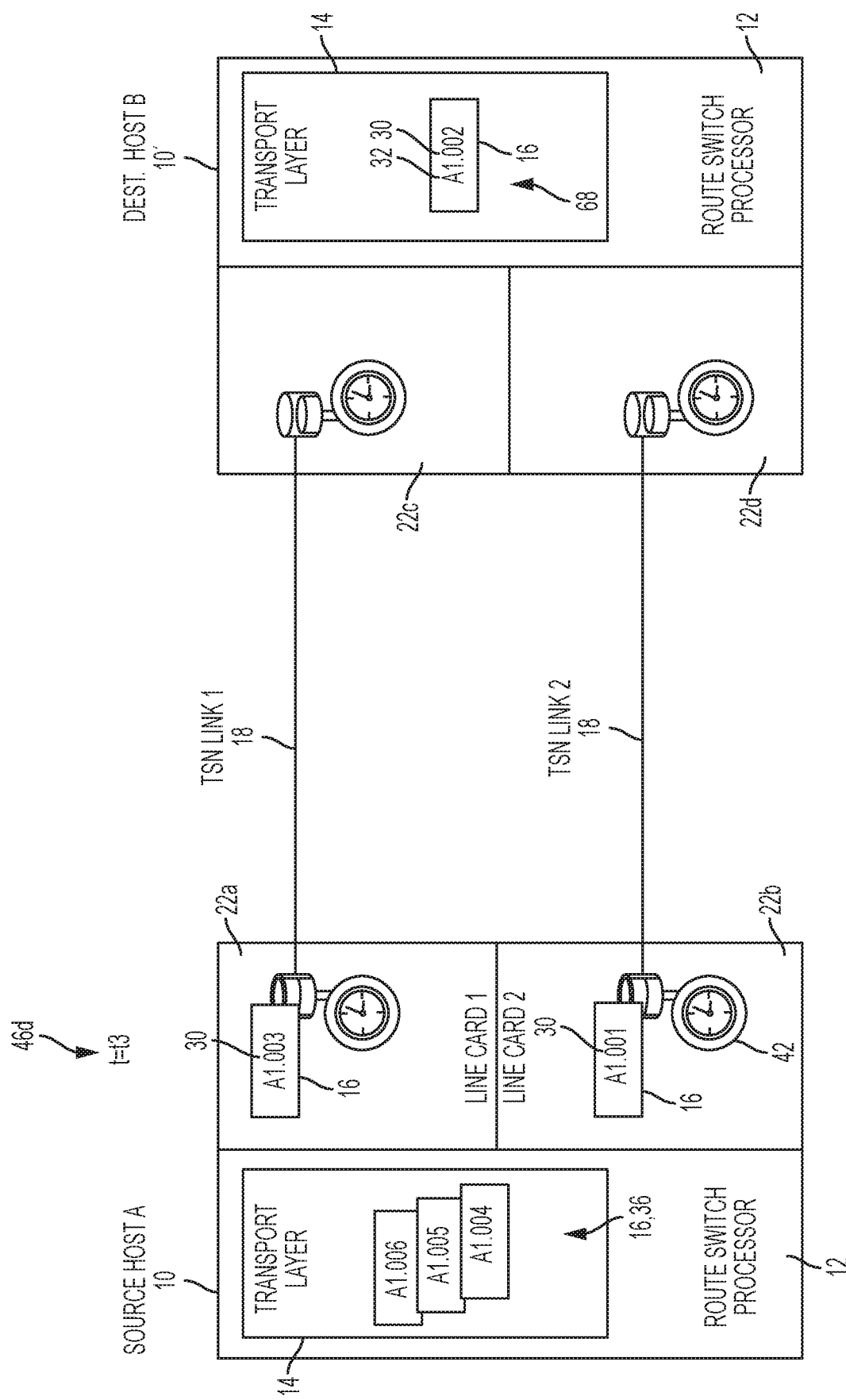
Figure 1E:
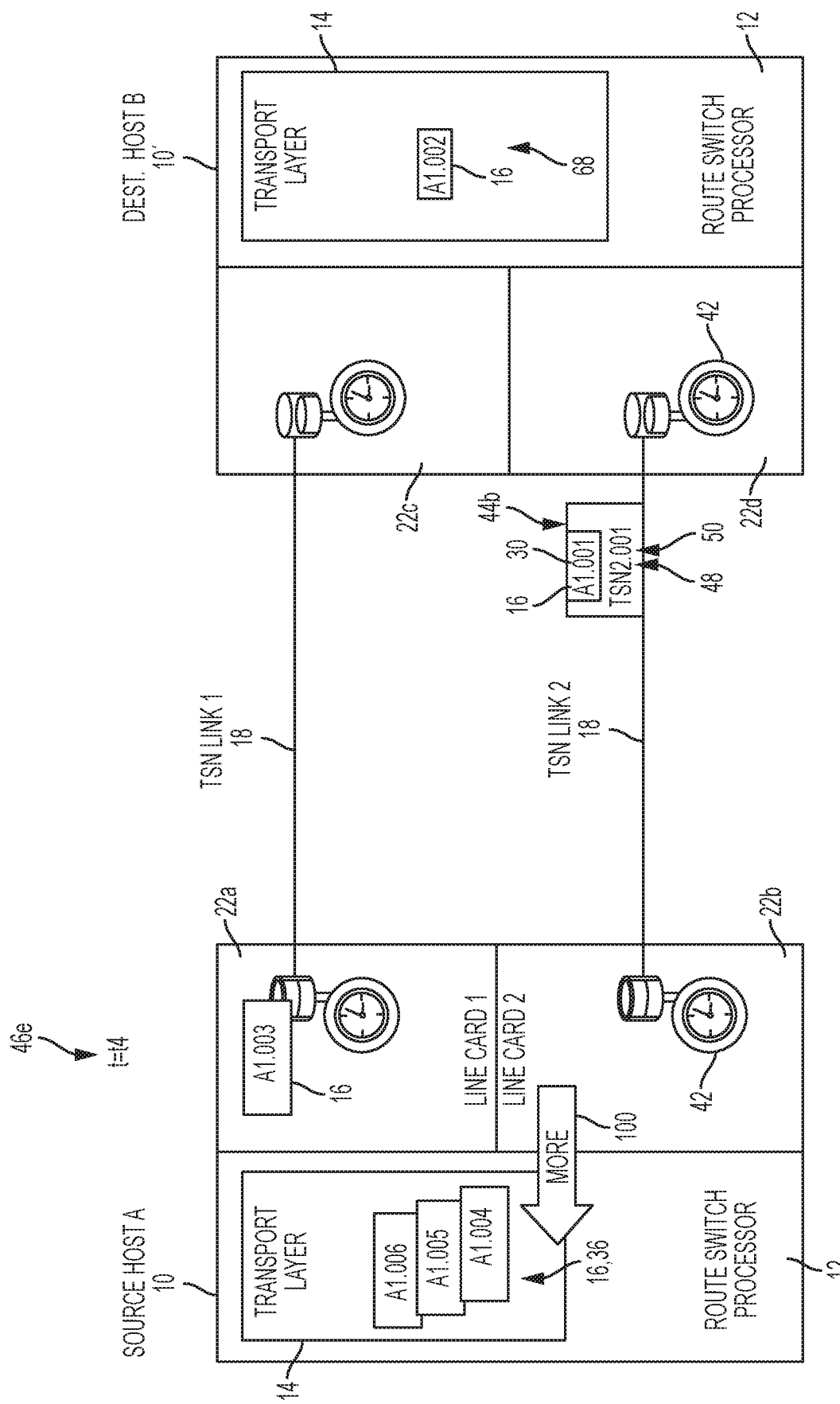
Figure 1F:
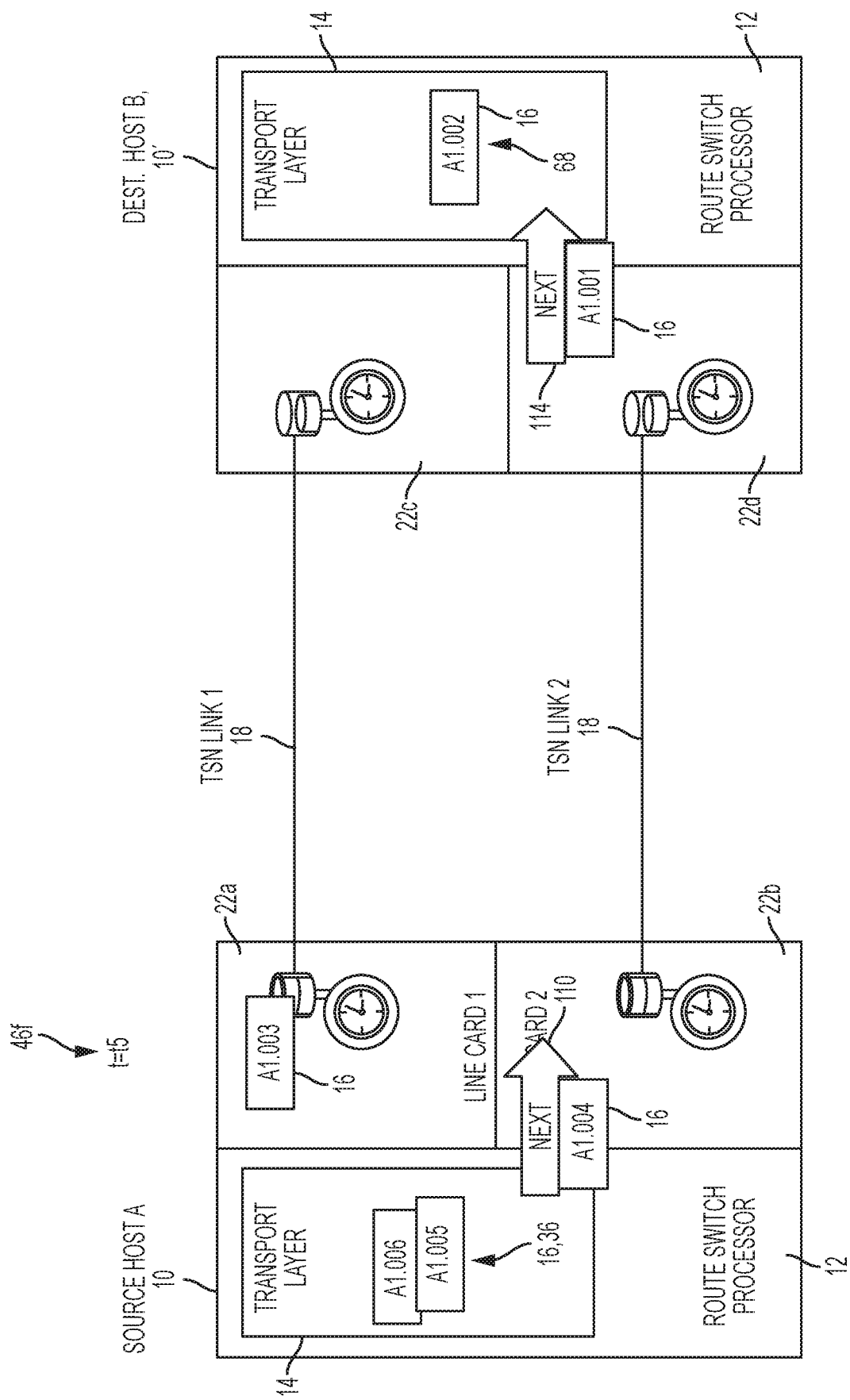
Figure 1G:
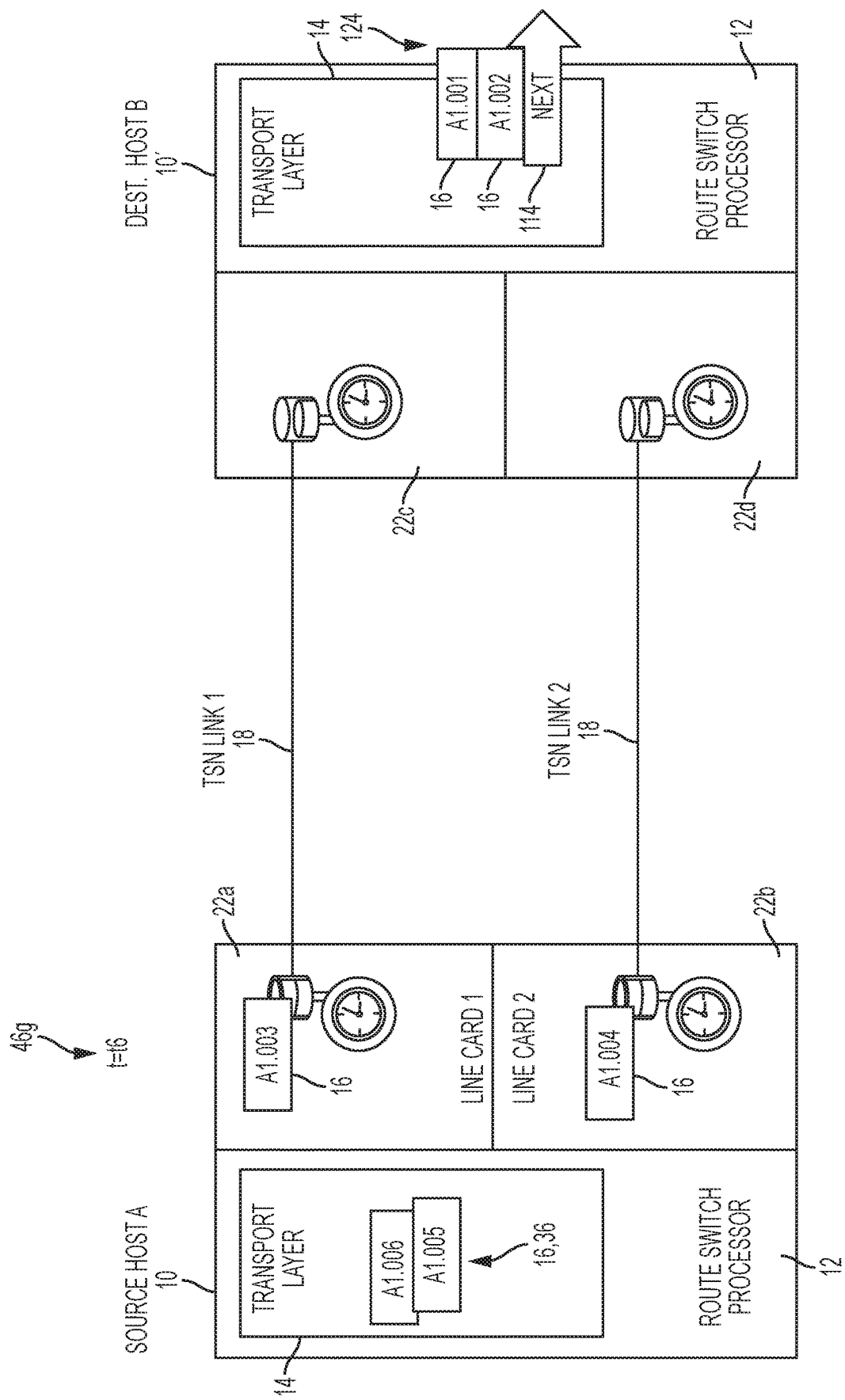
Figure 1H:
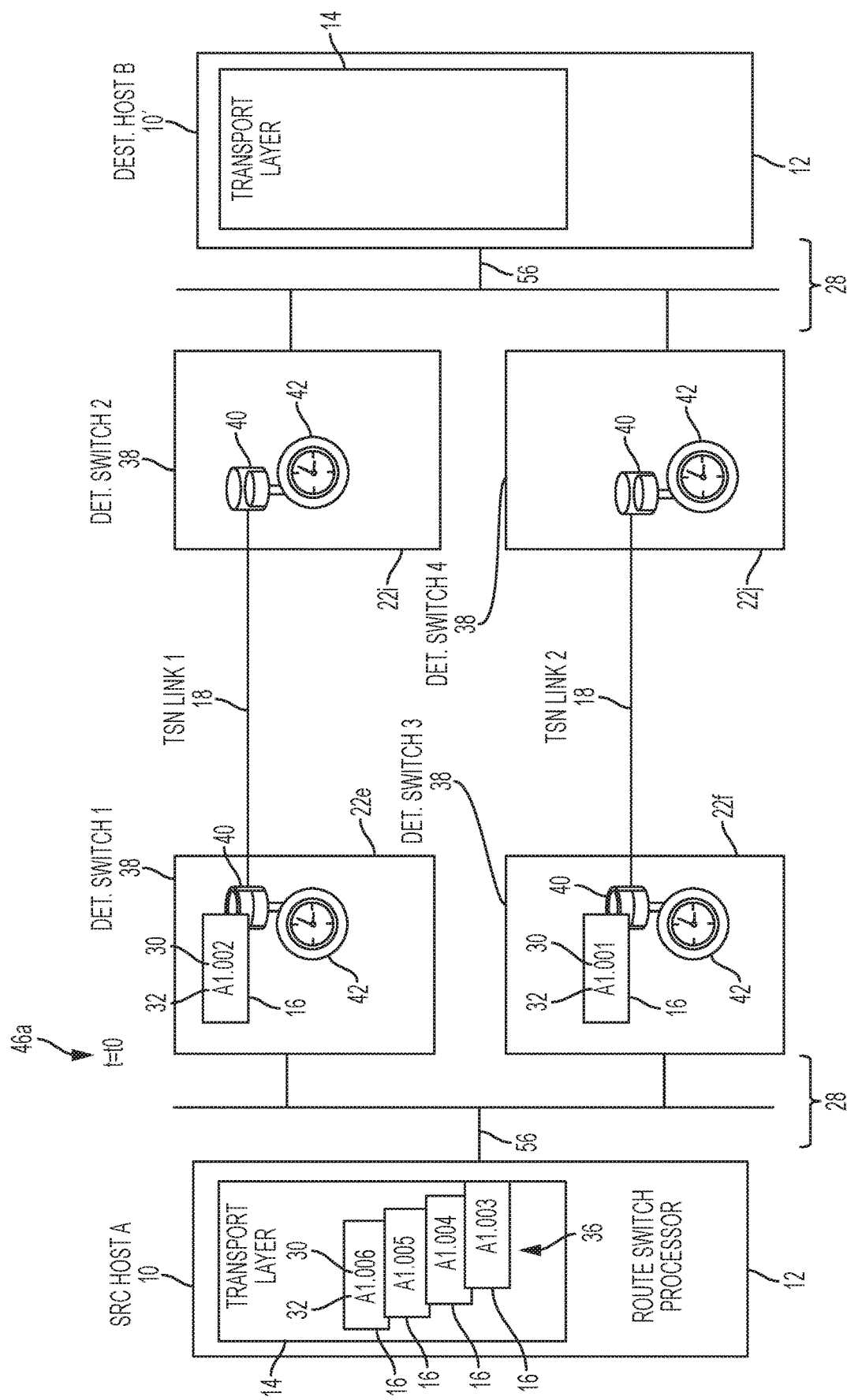

As illustrated in FIG. 1A and FIG. 1H, at event 46*a* at time t=t0 the deterministic network interface circuit 22*a* (or the deterministic network interface circuit 22*e* in FIG. 1H) stores the transport layer packet 16 having the transport sequence identifier "002" 30 in its corresponding transmit/receive buffer circuit 40, after the deterministic network interface circuit 22*b* (or the deterministic network interface circuit 22*f* in FIG. 1H) has previously stored the transport layer packet 16 having the transport sequence identifier "001" 30 in its corresponding transmit/receive buffer circuit 40.

Figure 1I:
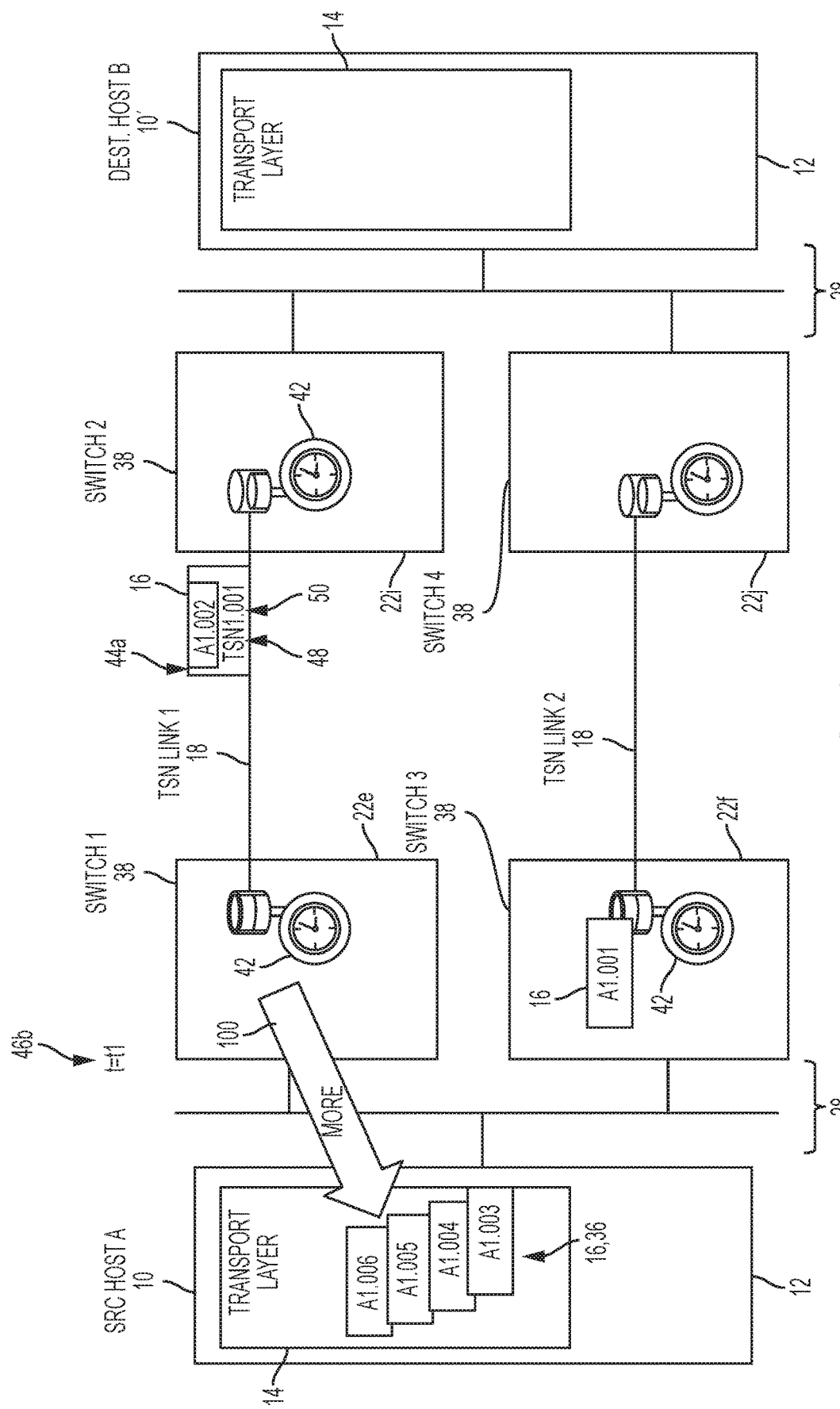

A deterministic network interface circuit 22 in operation 102 of FIG. 4B deterministically transmits its stored link layer data packet 44 (containing the transport layer packet 16) at the scheduled transmission instance 84 via the deterministic link 18 to its corresponding downstream deterministic network interface circuit 22. As illustrated in FIGS. 1B and 1I, at event 46*b* at time t=t1 (after event 46*a*) the transmit/receive gate circuit 42 of the deterministic network interface circuit 22*a* (or 22*e*) initiates its scheduled transmission 84 of a link layer data packet 44*a* that contains the transport layer packet 16 having the transport sequence identifier "002" 30 and comprising a link-layer (e.g., TSN layer) stream identifier "TSN1" 48 and a link-layer sequence identifier "001" 50; the transmit/receive gate circuit 42 of the downstream peer deterministic network interface circuit 22*c* (or 22*i*) at event 46*b* at time t=t1 deterministically receives the link layer data packet 44*a* (within a prescribed deterministic latency), and in response to reception thereof sends an acknowledgement to the deterministic network interface circuit 22*a* (or 22*e*) that causes the deterministic network interface circuit 22*a* (or 22*e*) in operation 104 and 106 to send a "more message" 100 to the transmitting transport layer 14. As apparent from FIG. 1B, for example, the transport sequence identifier 30 (generated by the transport layer 14) is distinct from the link-layer sequence identifier 50 generated by the deterministic network interface circuit 22.

If in operation 104 the deterministic network interface circuit 22*a* (or 22*e*) does not receive the acknowledgement following transmission of the link layer data packet 44*a*, the deterministic network interface circuit 22*a* (or deterministic network interface circuit 22*e*) optionally can retransmit, as appropriate according to the deterministic constraints established by the network manager device 24 and the link-layer protocol in use (e.g., according to a wireless deterministic protocol such as 6TiSCH).

The deterministic network interface circuit 22*a* (or 22*e*) in operation 106 transmits a "more" message 100 that can specify the transport sequence identifier "0.002" 30 (and optionally the transport flow identifier 32) of the transport layer packet 16, indicating successful deterministic transmission of the transport layer packet 16; the "more" message 100 optionally can specify a transmitter identifier (e.g., "Q1" for the deterministic network interface circuit 22*a* in FIG. 1B, "SW1" for the deterministic network interface circuit 22*e* in FIG. 1I). The "more" message 100 also can specify the associated deterministic constraints, for example the maximum packet size "F", and the maximum number of data packets "N" that can be transmitted on the corresponding deterministic link 18 within the period of time "T", enabling the retrieval of the next transport layer packet 16 having the correct packet size via remote memory read or message-initiated host transfer. The transport layer 14, in response to receiving in operation 108 the "more" message 100, can mark the associated transport layer packet 16 (having the identified transport sequence identifier "0.002" 30 specified in the "more" message 100) as successfully transmitted and clear (i.e., discard) the transport layer packet 16 having the transport sequence identifier "0.002" 30 from the transport layer transmit buffer circuit 36.

Figure 1J:
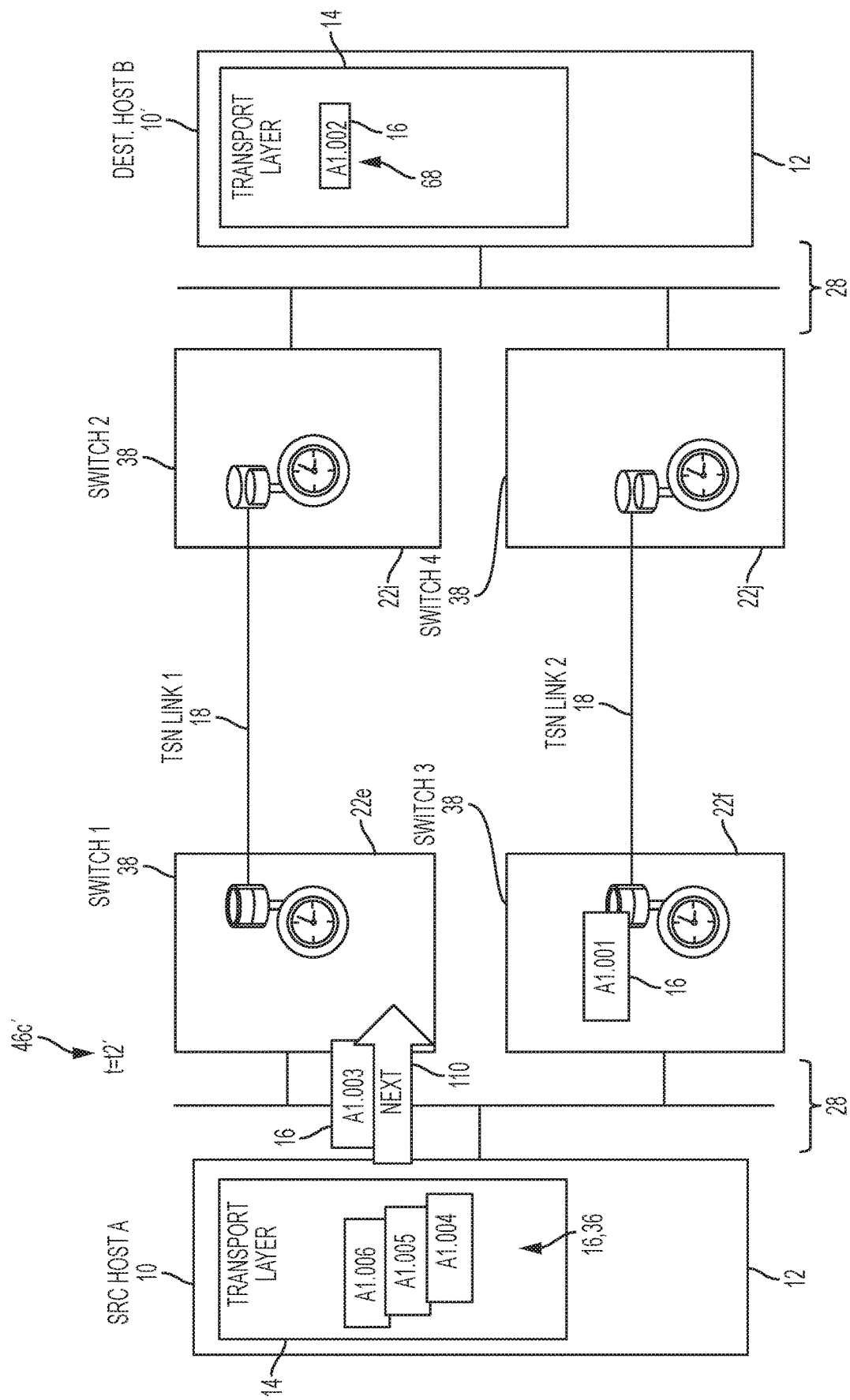

Referring to FIGS. 1C and 1J, at event "t=t2" 46*c* (or event "t=t2'" 46*c'* of FIG. 1J) (after event "t=t1" 46*b*) the deterministic network interface circuit 22*a* (or 22*e*), after having transmitted the "more" message 100, can repeat operations 100, 102, 104, and 106 for retrieval of the next transport layer packet 16 stored in the transport layer transmit buffer circuit 36 by at least pre-fetch interval 74 before the next scheduled transmission instance 84, namely the transport layer packet 16 having the transport sequence identifier "0.003" 30; the deterministic network interface circuit 22*a* (or 22*e*) at event "t=t2" 46*c* (or event "t=t2'" 46*c'* of FIG. 1J) in operation 99 also can fetch transport message metadata 110 associated with the retrieved transport layer packet 16. In an alternate embodiment the transport layer 14 can repeat operation 98 in response to receiving the "more" message 100 in operation 108, in order to actively cause the deterministic network interface circuit 22*a* (or 22*e*) to retrieve the next transport layer packet 16 from the transport layer transmit buffer circuit 36; this alternate embodiment can be preferred to avoid buffer underflow where the deterministic network interface circuit 22 would attempt to access the transport layer transmit buffer circuit 36 if empty.

Referring to FIG. 4C, the next receiving transport layer such as the destination transport layer 14 executed by the destination host device 10' (or the intermediate host device 10" in FIG. 2) in operation 112 can allocate its corresponding transport layer receive buffer circuit 68 based on the maximum latency expected across the deterministic links 18, as described previously with respect to operation 92. The destination transport layer 14 (based on coordinating with the network manager device 24 via the device manager 64) can allocate its corresponding transport layer receive buffer circuit 68 in its local device manager 64 based on determining the maximum latency interval (L_MAX) across all the allocated deterministic links 18 for the identified flow "A1" 32, the maximum number of transport layer packets 16 that can be transmitted across all the allocated deterministic links 18 during the maximum latency, and the maximum size "F" of the transport layer packets 16.

As described previously with respect to FIGS. 1B and 1I, the transmit/receive gate circuit 42 of the downstream peer deterministic network interface circuit 22*c* (or 22*i*) at event 46*b* at time t=1 deterministically receives the link layer data packet 44*a* (within a prescribed deterministic latency from the scheduled transmission instance 84), and in response the downstream peer deterministic network interface circuit 22*c* (or 22*i*) removes the link layer header (specifying the link-layer stream identifier 48 and the link-layer sequence identifier 50) and forwards the received transport layer packet 16 (specifying the transport sequence identifier "002" 30) to the transport layer 14, for example based on storing the received transport layer packet 16 in the transport layer receive buffer circuit 68 with receive message metadata 114 that notifies the receiving transport layer 14 of the received transport layer packet 16. Hence, the receiving transport layer 14 can respond to receiving the transport layer packet 16 in operation 116 by determining whether the corresponding transport sequence identifier 30 indicates the transport layer packet 16 is out-of-sequence, where the transport layer receive buffer circuit 68 is missing a transport layer packet 16 specifying a prior transport sequence identifier 30.

Similar to the transmitting transport layer 14 executed in the source host device 10, the receiving transport layer 14 executed in the intermediate host device 10" or the destination host device 10' can track the received transport sequence identifiers 30 for the transport layer packets 16 specifying the transport flow identifier "A1" 32. Hence, the receiving transport layer 14 can respond to the received transport layer packet 16 (specifying the transport sequence identifier "002" 30) by determining in operation 118 that it has not received a transport layer packet 16 specifying the preceding transport sequence identifier "001" 30. In response to detecting the absence of the missing transport layer packet, the receiving transport layer 14 in operation 120 can store the received transport layer packet 16 (specifying the transport sequence identifier "002" 30) in the transport layer receive buffer circuit 68 while awaiting the missing transport layer packet 16 specifying the transport sequence identifier "001" 30. As illustrated in FIG. 1D at event "t=t3" 46d (or event "t=t2'" 46c' of FIG. 1J) (after event "t=t2" 46c), the receiving transport layer 14 can store the received transport layer packet 16 (specifying the trans- port sequence identifier "002" 30) in its transport layer receive buffer circuit 68.

Referring to FIG. 1D, at event "t=t3" 46d the deterministic network interface circuit 22a is ready to transmit the transport layer packet 16 specifying the transport sequence identifier "003" 30, while the transmit/receive gate circuit 42 of the deterministic network interface circuit 22b is still waiting for its next scheduled transmission instance 84. The receiving transport layer 14 at event "t=t3" 46d continues to store in operation 120 the received transport layer packet 16 (specifying the transport sequence identifier "002" 30) in its transport layer receive buffer circuit 68.

Referring to FIG. 1E, at event "t=t4" 46e (after event "t=t3" 46d), the transmit/receive gate circuit 42 of the deterministic network interface circuit 22b (or 22f) in operation 102 initiates its scheduled transmission 84 and deterministically transmits the link layer data packet 44b containing the transport layer packet 16 having the transport sequence identifier "001" 30, the link-layer stream identifier "TSN2" 48, and the link-layer sequence identifier "001" 50, according to the deterministic constraints established by the network manager device 24. The deterministic network interface circuit 22b (or 22f) in operation 106 transmits a "more" message 100 that can specify the transport sequence identifier "0.001" 30 (and optionally the transport flow identifier 32) of the transport layer packet 16, indicating successful deterministic transmission of the transport layer packet 16. The transmitting transport layer 14, in response to receiving in operation 108 the "more" message 100, can mark the associated transport layer packet 16 (having the identified transport sequence identifier "0.001" 30 specified in the "more" message 100) as transmitted, and clear (i.e., discard) from the transport layer transmit buffer circuit 36 the transport layer packet 16 having the transport sequence identifier "0.001" 30.

The deterministic network interface circuit 22b (or 22f), after having transmitted the "more" message 100, can repeat operations 100, 102, 104, and 106 for retrieval of the next transport layer packet 16 stored in the transport layer transmit buffer circuit 36 by at least the pre-fetch interval 74 before the next scheduled transmission instance 84, namely the transport layer packet 16 having the transport sequence identifier "0.004" 30. Referring to FIG. 1F, the deterministic network interface circuit 22b (or 22f) at event "t=t5" 46f in operation 99 also can fetch transport message metadata 110 associated with the retrieved transport layer packet 16 having the transport sequence identifier "0.004" 30.

Referring to FIG. 1E, the transmit/receive gate circuit 42 of the downstream peer deterministic network interface circuit 22d (or 22j) deterministically receives the link layer data packet 44b (within a prescribed deterministic latency from the scheduled transmission instance 84 at event 46e), and in response the downstream peer deterministic network interface circuit 22d (or 22j) removes the link layer header and forwards the received transport layer packet 16 (specifying the transport sequence identifier "001" 30) to the transport layer 14.

As illustrated in FIG. 1F, at event "t=t5" 46f the receiving transport layer 14 receives in operation 116 the transport layer packet 16 (specifying the transport sequence identifier "001" 30), and associated receive message metadata 114, and the receiving transport layer 14 in operation 118 determines reception of the "missing" transport layer packet 116 (specifying the transport sequence identifier "001" 30). Hence, the receiving transport layer 14 in operation 122 can receive the "missing" transport layer packet 116 (specifying the transport sequence identifier "001" 30) and reorder the received transport layer packets 16 from the received order (e.g., "002", "001"), into the transmit order (e.g., "001", "002").

In response to reordering the received transport layer packets 16 in operation 122, the receiving transport layer 14 can output the transport layer packet 16 in the transmit order in operation 124, illustrated at event "t=t6" 46g in FIG. 1G. In the case of the destination host device 10', the destination transport layer 14 can forward the received transport layer packet 16, in the transport order, to a higher layer application such as the executable application 34 for delivery of the recovered identified flow of application data 70; in the case of an intermediate host device 10", the transport layer 14 executed in the intermediate "fog" host device 10" can cause the next deterministic network interface circuits (e.g., 22k, 22l, 22m) in operation 98 to deterministically retrieve the transport layer packets 16 for the next deterministic domain 26b.

According to example embodiments, a unique interface can be established between an executable application in a host device and deterministic network interface devices in a deterministic network, without the necessity of the executable application being aware of the deterministic network. The example embodiments provide a transport layer that can be installed in any host device and that can ensure transport layer data packets (and above) can be recovered following transmission via one or more deterministic networks, even if the transport layer packets encounter reordering due to mismatched latencies or unsynchronized portions between the source application host (executed in the source host device) and the destination application host (executed in the destination host device).

The example embodiments also enable a transport layer to identify changes in the QoS requirements of the executable application, or increases in latency encountered within the transport and/or receive transport layer buffers, and respond accordingly. For example a source transport layer can recalculate the required deterministic data links that are required for the changed QoS requirements, and update the network manager (to increase or decrease the number of allocated deterministic links) and change the transmit and/or receive transport layer buffers, accordingly. Hence, the example embodiments enable a transport layer to acquire additional deterministic data links in response to detected increases in latency, or release excess deterministic data links if the QoS requirements of the executable application are reduced.

Jitter Elimination and Latency Compensation at DetNet Transport Egress

FIGS. 6A-6H illustrate an example jitter elimination and latency compensation at a Deterministic Network (DetNet) transport device, according to an example embodiment.

Figure 7A:
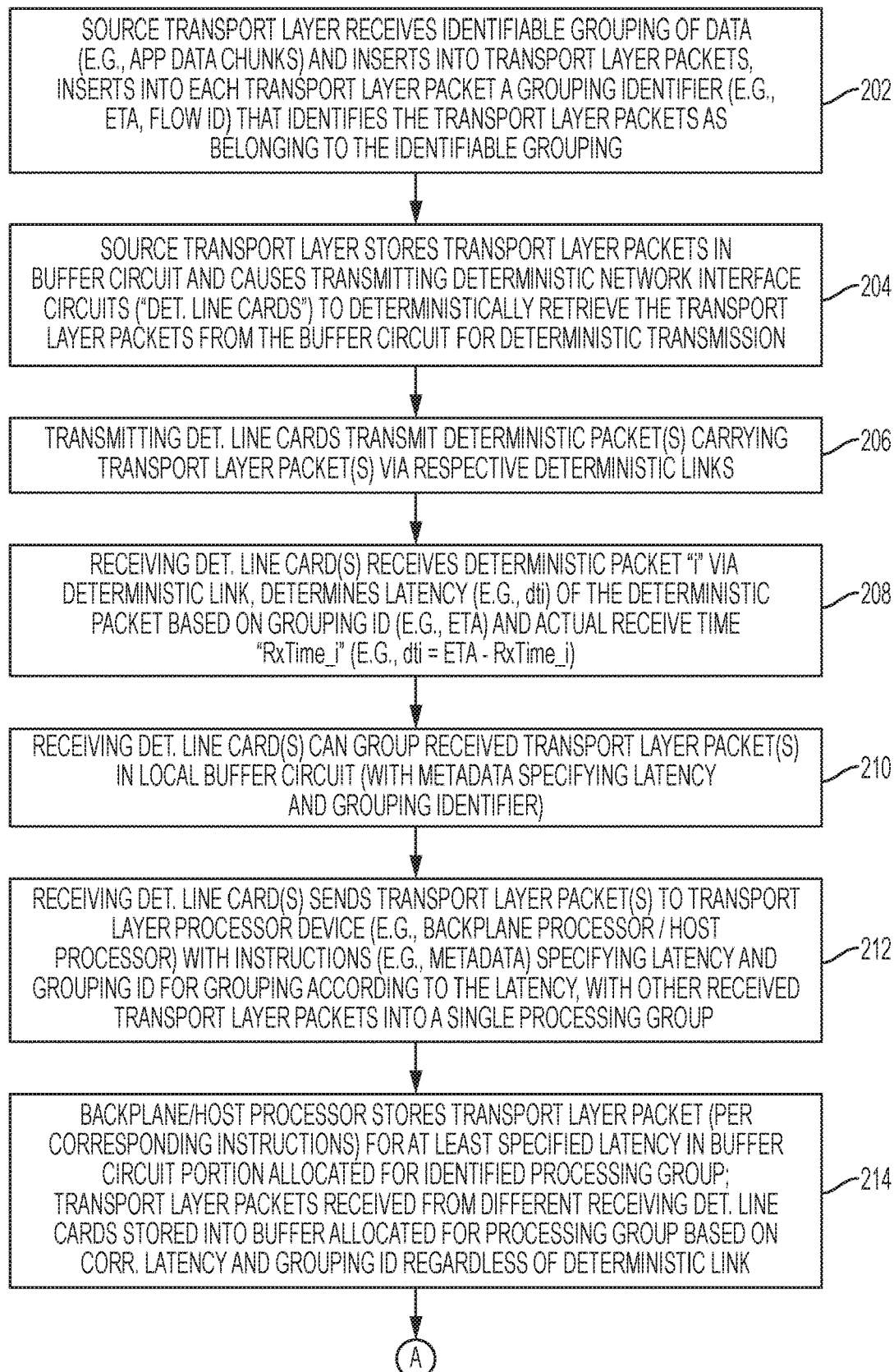
FIGS. 7A-7B illustrate an example method of transport layer processing (e.g. jitter elimination, latency compensation, packet reordering, duplicate elimination, error recovery) on received transport layer packets grouped into a single processing group, by an example DetNet transport device, according to an example embodiment.
Figure 7B:
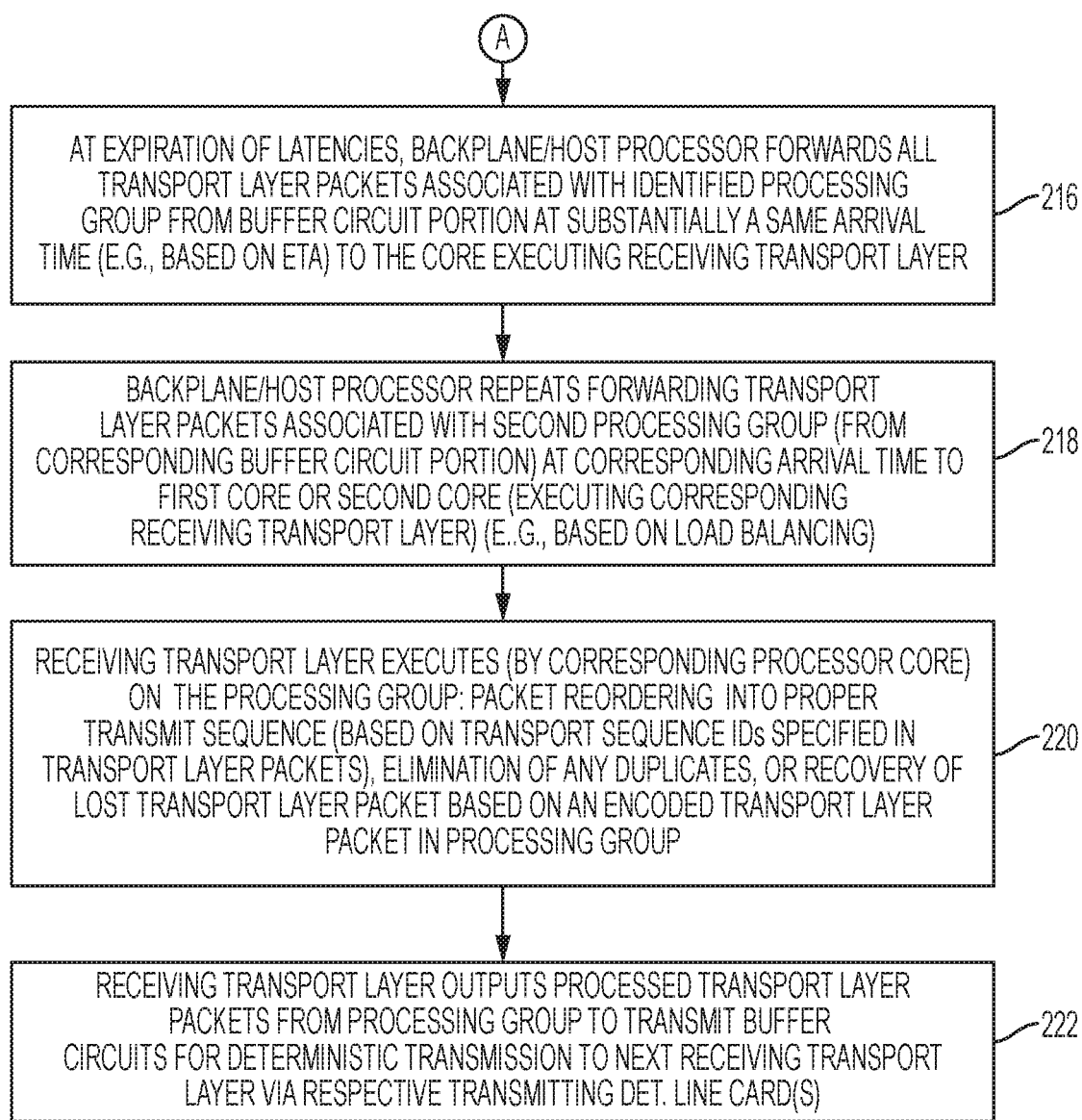

FIGS. 7A-7B illustrate an example method of transport layer processing (e.g. jitter elimination, latency compensation, packet reordering, duplicate elimination, error recovery) on received transport layer packets grouped into a single processing group, by an example DetNet transport device, according to an example embodiment.

Particular embodiments can utilize the previously-described components and operations to enable insertion of a grouping identifier (200 of FIGS. 6A-6H) (e.g., an "estimated time of arrival" (ETA) or flow identifier) for transport layer packets 16 that are to be transmitted across multiple deterministic links 18 in a deterministic data network. The grouping identifier 200, inserted by a source transport layer 14, enables receiving deterministic network interface circuits (also referred to herein as deterministic line cards) 22 to group the received transport layer packets 16, regardless of different jitter and/or latency attributes encountered across the different deterministic links 18, into a single processing group for a next receiving transport layer 14 (e.g., an intermediate transport layer 14a, 14b of FIG. 6H executed in an intermediate network device 10", or a destination transport layer 14 executed in a destination host device "Host 2" 10' or 10").

Hence, transport layer packets 16 transmitted can be regrouped together into a single processing group for the next receiving transport layer (e.g., at an intermediate network device or a destination host) 14, regardless of the deterministic link used to transmit the transport layer packets 16. As described below with respect to FIGS. 6G and 6H, the transport layer packets 16 can be supplied, as a single processing group, to the receiving transport layer 14 for processing. The supply of the transport layer packets in the single processing group enables the receiving transport layer 14 to perform transport layer processing on any or all of the transport layer packets associated with the identified grouping (e.g., packet reordering, elimination of duplicate packets, recovery of lost packets using one or more encoded packets in the single processing group, etc.). The supply of the received transport layer packets as a single processing group enables the processing group to be handled with minimal delays by the receiving transport layer. The supply of the received transport layer packets as a single processing group also enables different processing groups to be supplied to different processor cores, enabling distributed processing of a transport layer across multiple processor cores.

Problems addressed by the example embodiments include recognizing that Industrial networking requires predictable communications between devices. Deterministic networking refers to networks that can guarantee the delivery of packets within a bounded time. This translates in the following characteristics: High delivery ratio (loss rate of $10^{-5}$ to $10^{-9}$ depending on the application); Fixed latency; Jitter close to zero (micro seconds); a limited degree of control that can be achieved with QoS tagging and shaping/admission control.

For Time Sensitive flows, though, latency and jitter can only be fully controlled with the effective scheduling of every transmission at every hop.

In turn, the delivery ratio is optimized by applying packet redundancy (PRP, HSR) with all possible forms of diversity, in space, time, frequency, code (in CDMA), hardware (links and routers) and software (implementations).

The example methods described above apply to both Ethernet or Wireless technologies. Mixed approaches combine QoS technologies with scheduling (emission of packets on the different QoS queues is triggered by a schedule based gate mechanism), which is known as being the only solution effectively providing hard guarantees since over capacity provisioning can only help in some ways, without avoiding queuing in presence of a burst of traffic that would unavoidably lead to delays.

Deterministic Ethernet or Deterministic Wireless based on time-scheduled mechanism require that all the nodes being part of the path to be time synchronized. Network Time Protocol (NTP) or Precision Time Protocol (PTP) are examples of technologies used to ensure time distribution among all the nodes. Precision needs to go to microseconds for Ethernet based communications.

The Forwarding of each packet is then regulated by a time schedule that specifies when this specific packet has to be transmitted to the wire or the radio and this for each node on the path. This specific time period is called a time slot.

An external agent (called the orchestrator) usually performs the computation of this path and the associated timetable. Such a model is similar to the PCE (Path Computation Engine), which was invented for MPLS network in order to compute Traffic Engineering Label Switch Path, with the major difference that Time Schedule is provided instead of simply a constrained shortest path. (the path in this example being both the path between physical nodes and the timetable associated to each flow).

When the computation is done, the path and the timetable are then downloaded on every node participating to the forwarding, which in turn start receive and transmit packets according to the computed time schedule. When more packets arrive in a given time window than scheduled, a deterministic switch will protect itself and declassify or drop packets. It results that in a deterministic network, a timing issue may result in a "timeliness loss" as opposed to a classical "congestion loss".

Deterministic networking is a fundamental component of the Internet of Things, highly required for time critical applications such as industrial automation to inflight control system or internal vehicle networking. Most of these application fields are mission critical and require novel solution since up to recently they are manual controlled an operated, the emergence of dynamic system requiring the specification of the number of new solutions to address fast emerging requirements.

Deterministic networking is specified at the IETF (DETNET) and the IEEE (TSN/AVB). Packet Replication and Elimination, as well as network Coding and reordering after Load Distribution suffer from the variability of jitter over multiple parallel DetNet segments. At high speeds the receiving endpoint may have to consider vast amounts of packets received for multiple flows and sort out which are related, e.g. duplicates of a same packets or participating to a same network coding group of packets. This creates a bottleneck at the CPU level, makes it difficult to spread the load over multiple cores.

Figure 6A:
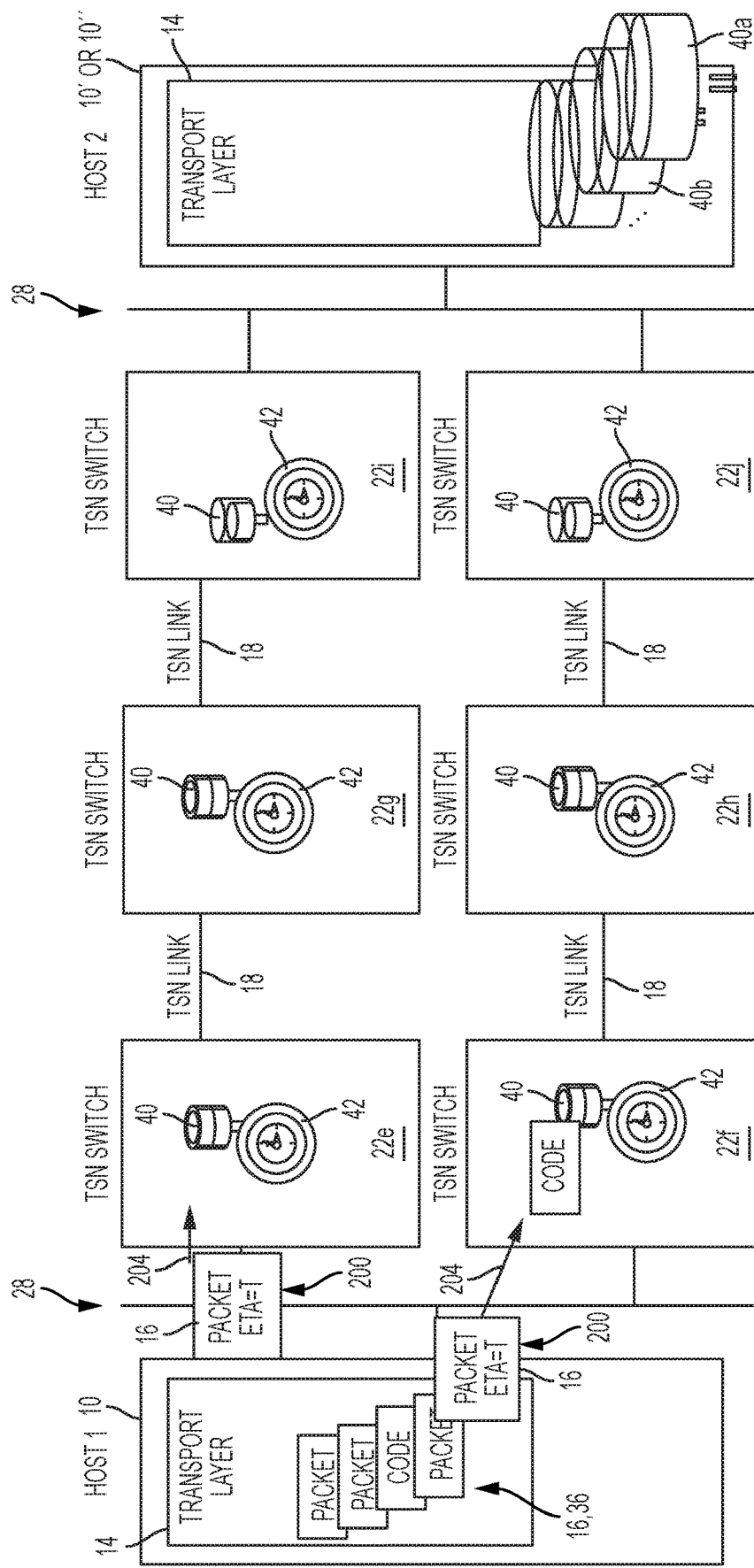
FIGS. 6A-6H illustrate an example jitter elimination and latency compensation at a Deterministic Network (DetNet) transport device, according to an example embodiment.
Figure 6B:
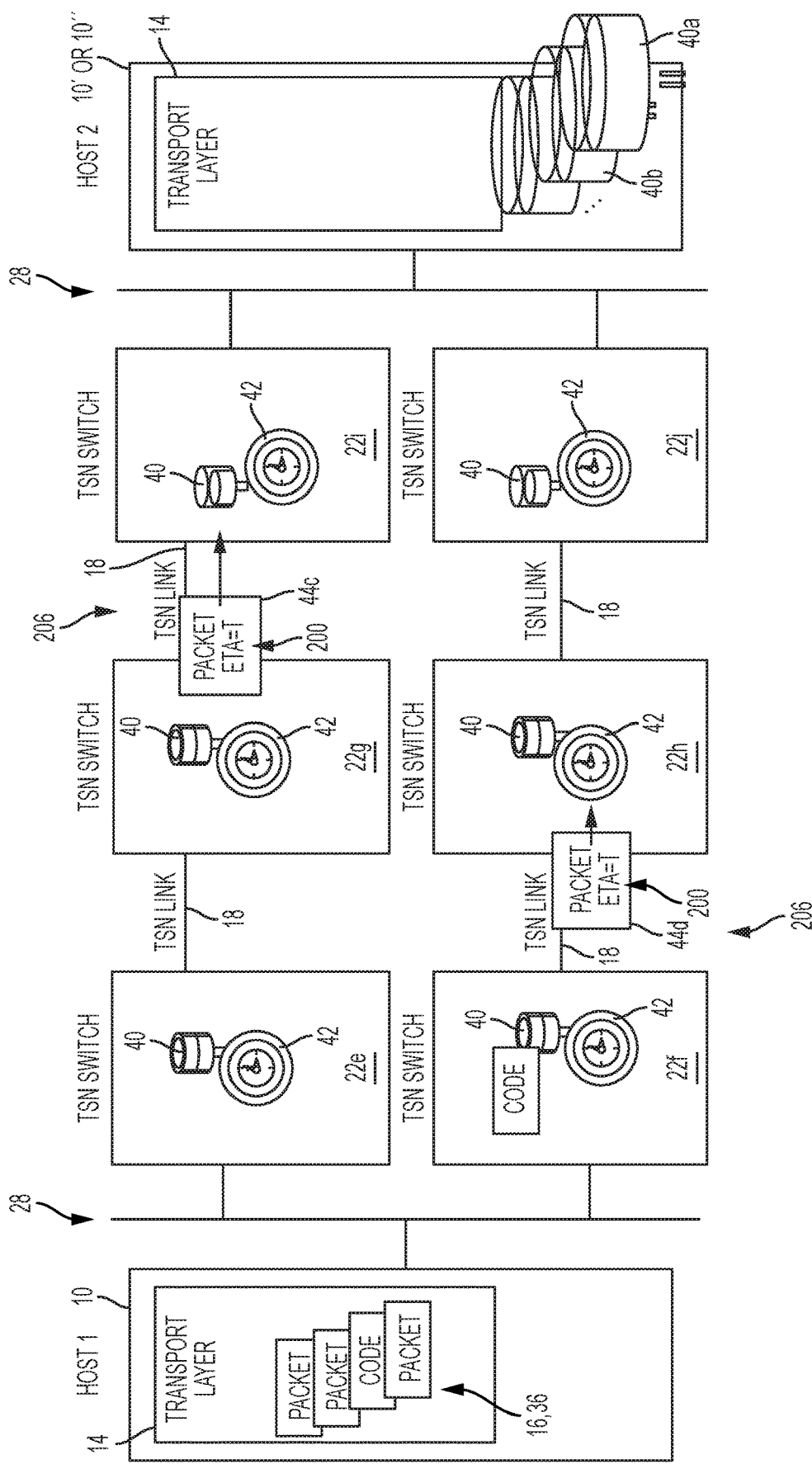
Figure 6C:
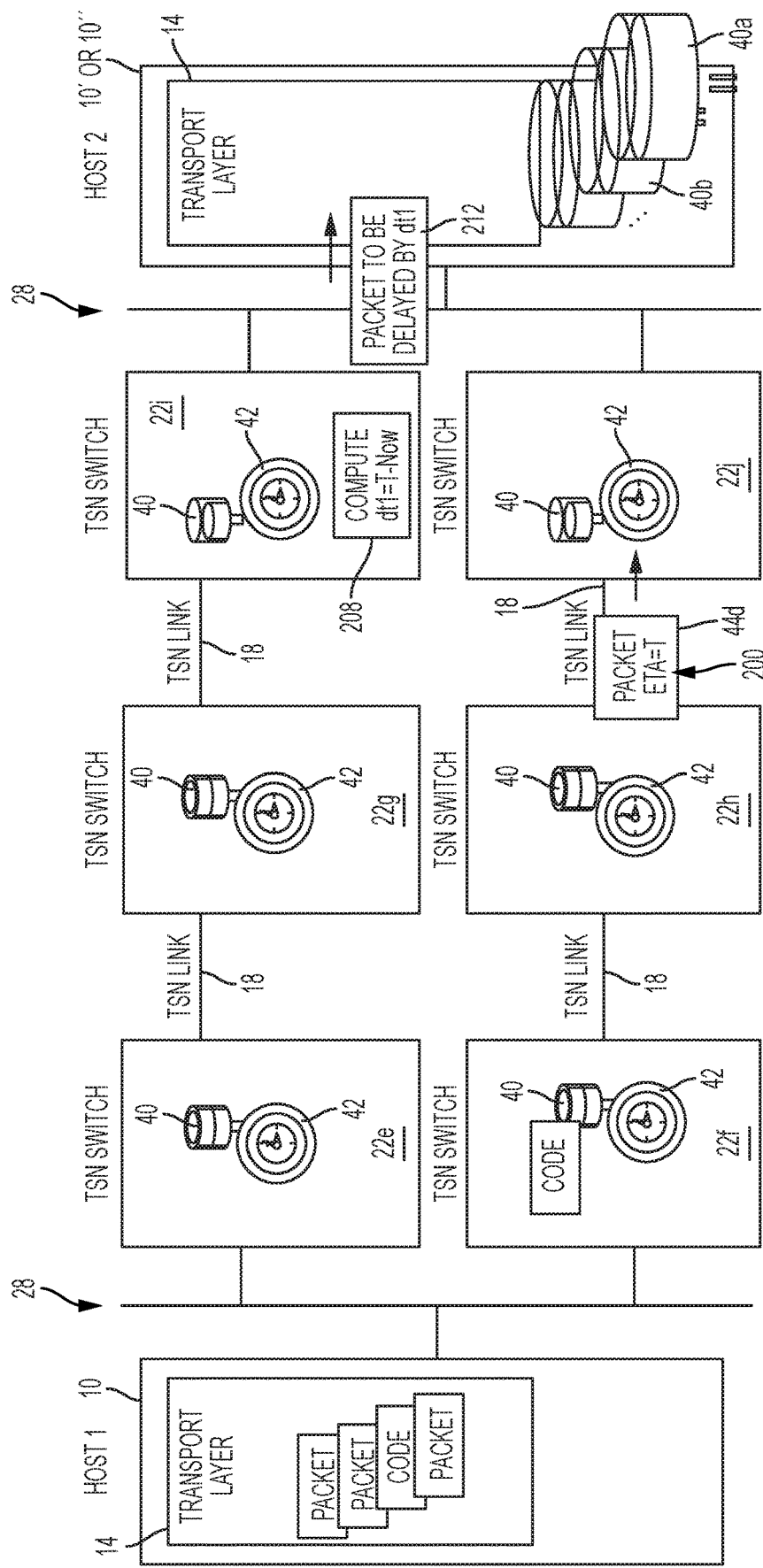
Figure 6D:
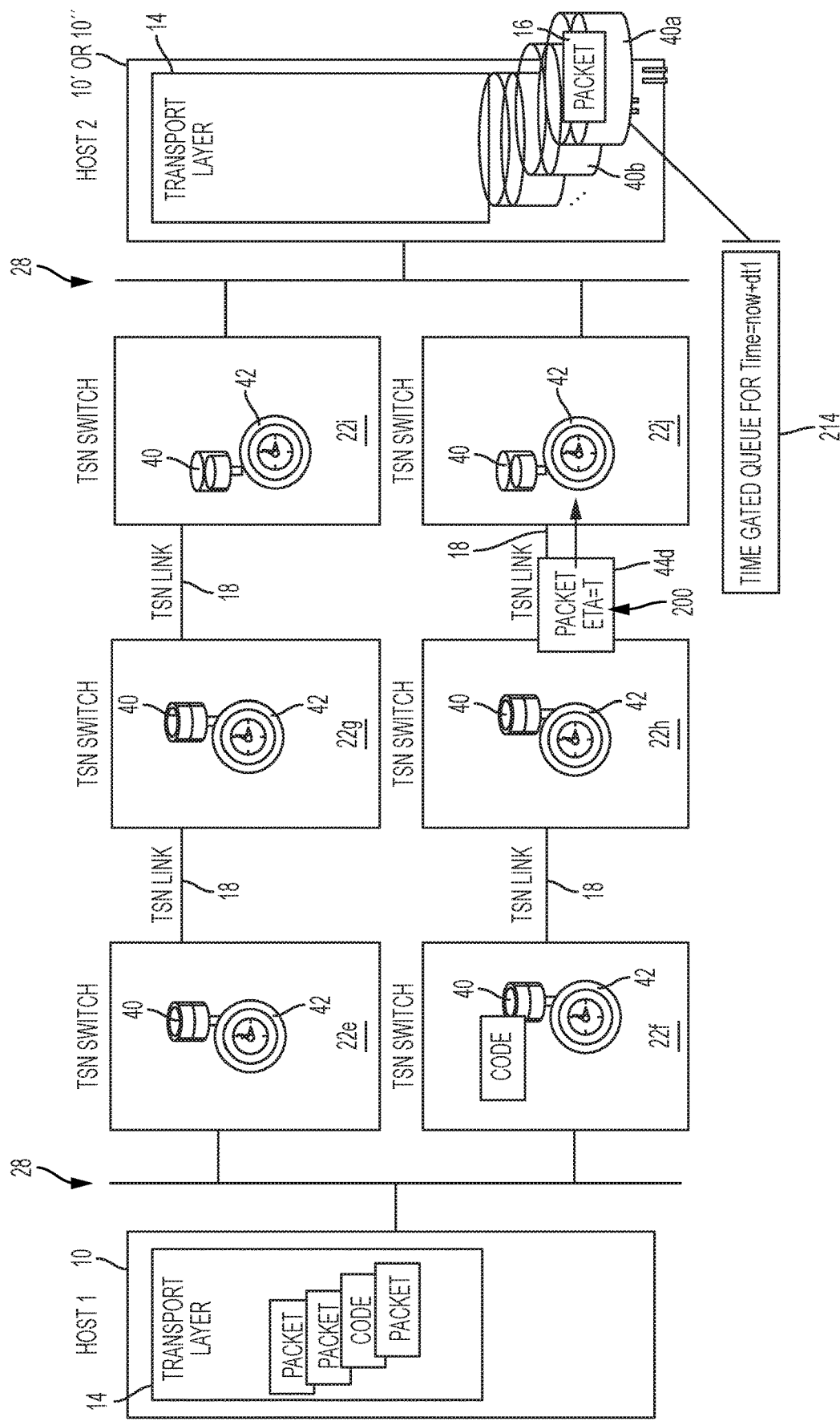
Figure 6E:
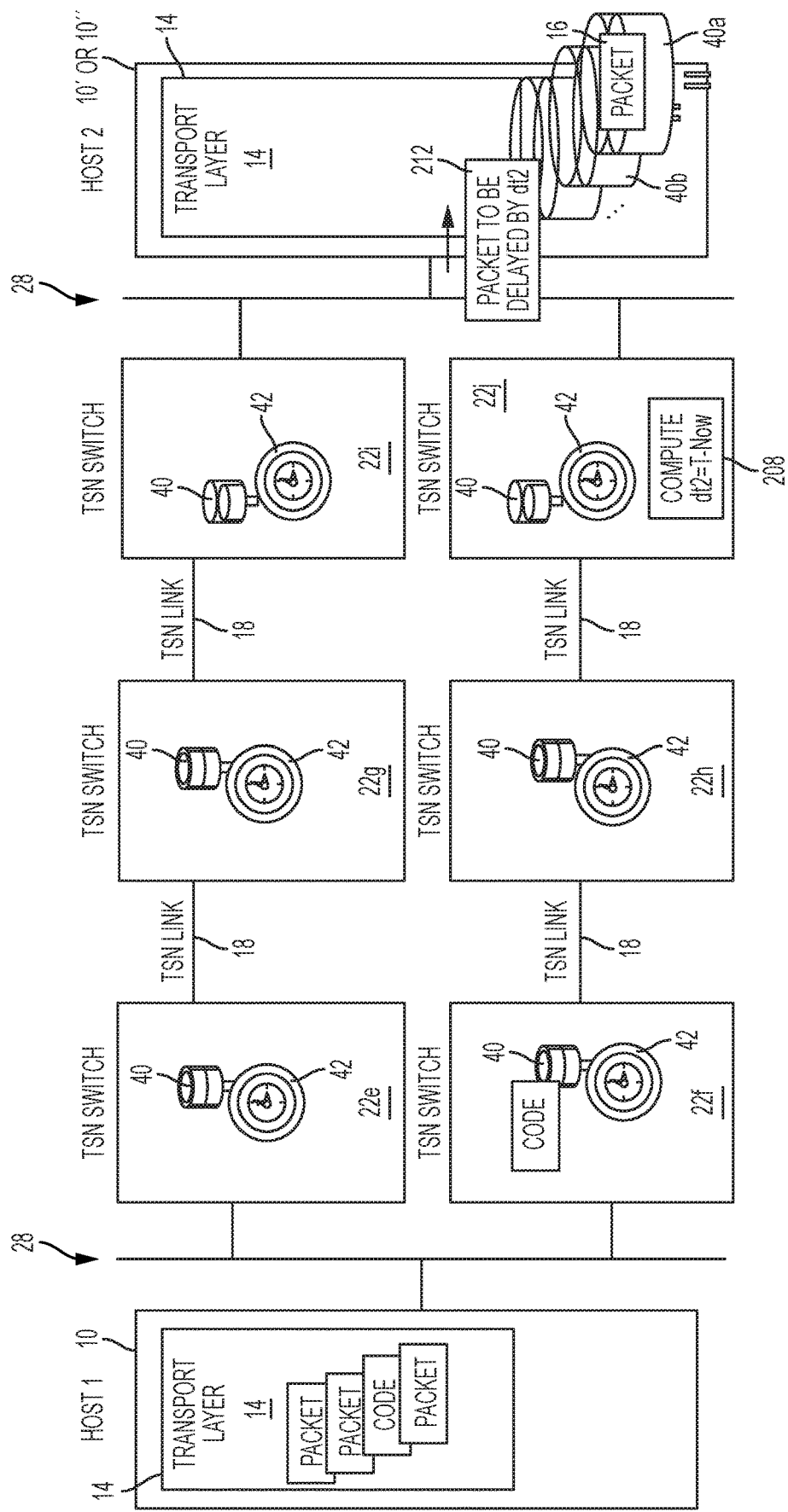
Figure 6F:
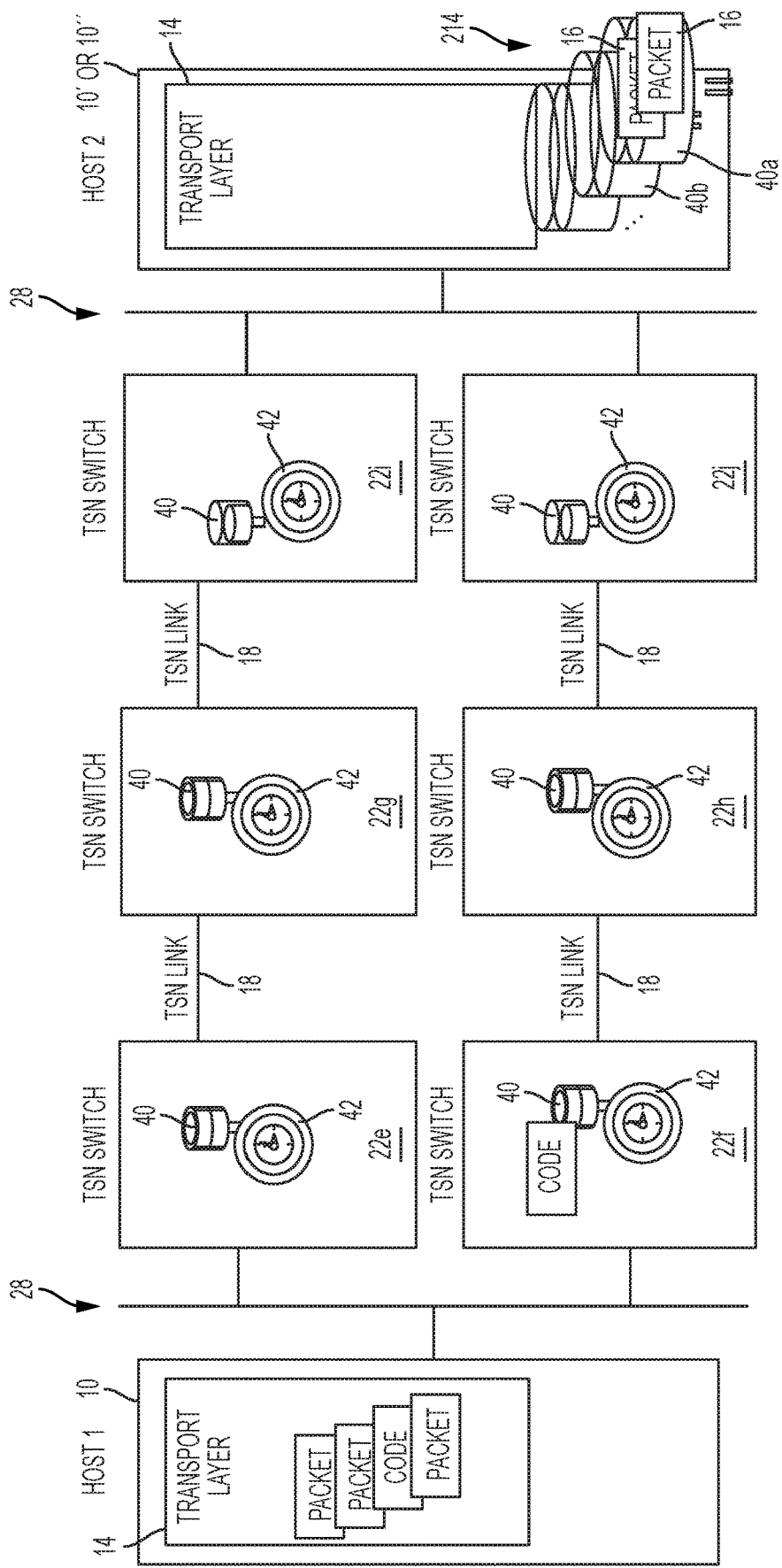
Figure 6G:
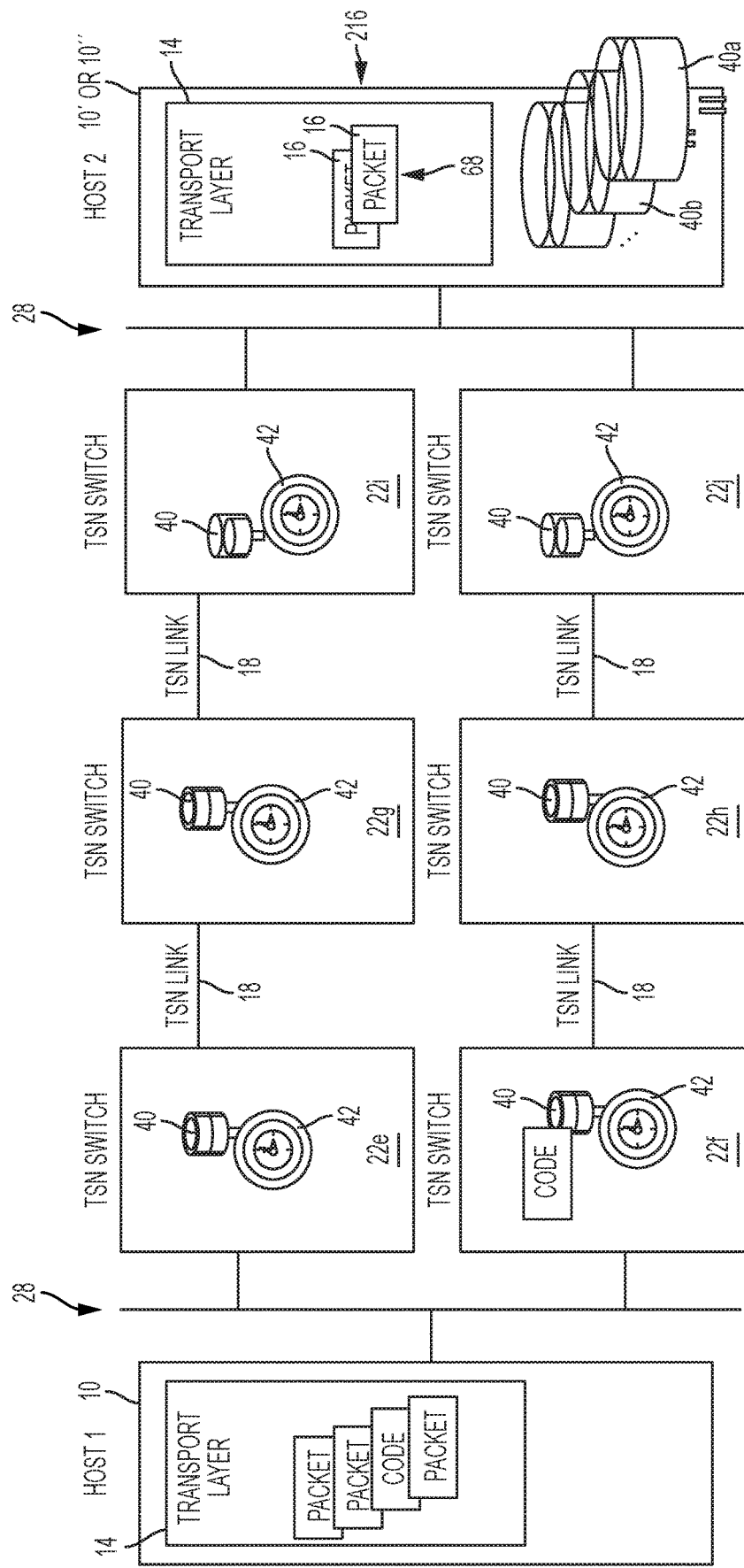
Figure 6H:
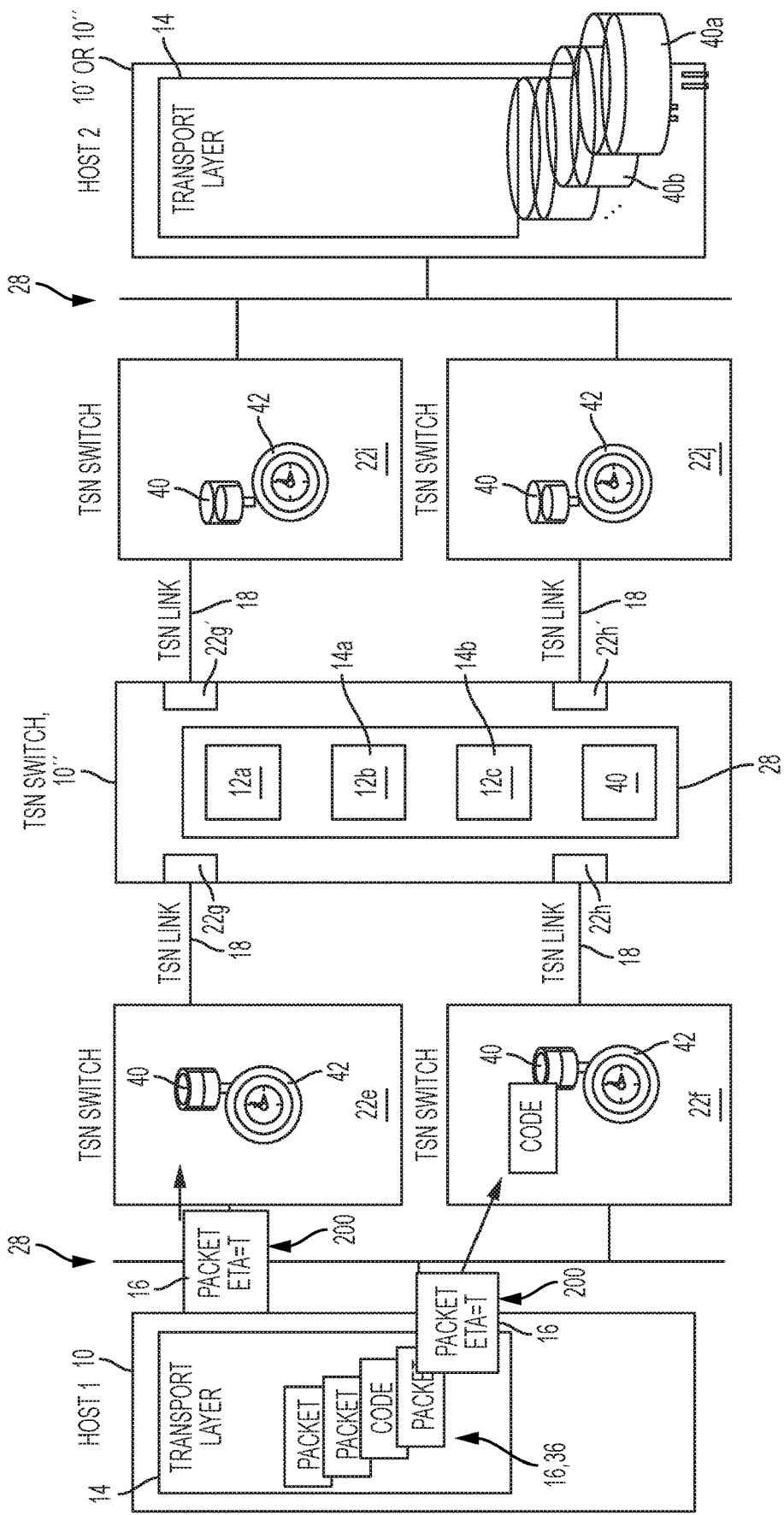

According to an example embodiment, a receiving network device such as an Egress Edge Bridge (or router) of the Deterministic Network can indicate a latency, referred to also as a delta time "dt", that should be used before delivery of a received transport layer packet 16 to the receiving transport layer (e.g. 14 of the intermediate device 10" of FIG. 2; 14a, 14b of an intermediate device 10" of FIG. 6H, and/or 14 of the host device 10' or 10" of FIGS. 6A-6H).

Hence, transport layer packets 16 can be delivered to the receiving transport layer 14 as small bunches (i.e., groupings) of packets that are related to one another, i.e., a "single processing group" for processing by the receiving transport layer. Hence, a "bunch" or "single processing group" of transport layer packets 16 can be processed by a single processor core circuit (e.g., 12b or 12c of FIG. 6H) executing a corresponding transport layer (e.g., 14a or 14b of FIG. 6H) which can execute transport layer processing on the transport layer packets 16 in the single processing group, including any one of reordering transport layer packets 16 within the bunch, eliminating duplicates in the bunch (e.g., based on execution of Packet Replication and Elimination in the deterministic network), and/or recovery of a lost packet using an encoded transport layer packet in the bunch. The transport layer packets 16 associated with the next bunch (i.e., a second different processing group from a second different identifiable group of data) can be delivered to a different processor core circuit (e.g., 12c) while a currently-utilized processor core circuit (e.g., 12b) is still processing its allocated bunch.

As illustrated in FIGS. 6A, 6H, and FIG. 7A, the processor circuit executing the source transport layer 14 in the source network device 10 can receive in operation 202 an identifiable grouping of data chunks, for example described above with respect to FIG. 1A as a flow of application data originated by an executable application (34 of FIG. 3): the source transport layer 14 is configured for inserting the data chunks into the transport layer packets 16 as described above, and in operation 202 is configured for inserting into each transport layer packet a grouping identifier 200. The grouping identifier 200 inserted in operation 202 into each transport layer packet 16 associated with the same transport flow enables the transport layer packets 16 to be grouped as a "bunch" at the source transport layer 14 (in the host network device 10).

The source transport layer 14 in the source network device 10 in operation 204 can store the transport layer packets 16 in the buffer circuit 36 as described previously. Hence, the storing in operation 204 includes the transport layer packets including the grouping identifier 200 identifying the transport layer packets as belonging to the identifiable grouping. FIG. 6A illustrates the case where a bunch comprises a pair of copies of a packet in 1+1 PRE redundancy. In FIG. 6A, Source Host 10 sends in operation 204 two copies of transport layer packets 16 with same ETA 200 to deterministic network interface circuits 22e and 22f.

The source transport layer 14 in the source network device 10 in operation 206 can cause the transmitting deterministic line cards (e.g., 22a, 22b, 22e, and/or 22f) to transmit the deterministic link layer packets 44 (carrying the transport layer packets 16) via the respective deterministic links 18, as described previously with respect to FIGS. 1A-1J. In FIG. 6B, link layer packets 44c and 44d progress in parallel in operation 206 with different progress across the deterministic network.

As described below, the grouping identifier 200 in each transport layer packet 16 enables downstream receiving deterministic network interface circuits 22 (e.g., in the TSN switch 10" of FIG. 6H or the "Host 2" in FIGS. 6A-6H) to group the received transport layer packets 16 into a single processing group for the next receiving transport layer (in an intermediate network device such as the TSN switch 10" of FIG. 6H and/or a destination host device "Host 2" of FIG. 6H), regardless of the deterministic link 18 used for transmission, and regardless of any reordering that may be encountered by the transport layer packets 16 among the different deterministic links.

The "bunch" may be indicated with a "tag" (i.e., grouping identifier") 200 such as a bunch ID, a flow identifier, and/or a delivery time or estimated time of arrival (ETA). The grouping identifier 200 enables each of the transport layer packets 16 associated with the identifiable grouping (i.e., the "bunch") to be delivered together as a single processing group at the next receiving transport layer (e.g., an intermediate transport layer or a destination transport layer), at the same time as well as to the same handler (same virtual machine/same processor core).

A bunch (i.e., identifiable grouping) may for instance be several copies of a same packet in Packet Replication and Elimination (PRE) mode. A bunch also can be a collection of transport layer packets 16 and "network codes" (e.g., one or more network coded packets used for recovery of a lost packet) of this collection of transport layer packets. A bunch also can be a series of ordered transport layer packets. The source transport layer 14 of the source host ("Host 1" of FIG. 6A) 10 can indicate to the deterministic network components an ETA value, that is time of delivery for the bunch, relative to now (i.e., the current time instance). This time can be expressed as a network average latency (the transport may not need to indicate it) plus a guard time. The guard time is taken to cover the possible jitter and drift of the receiver clock while the received portion of the bunch is waiting in the receiver memory. The size of the bunch is computed as a guard time*the flow speed (i.e., guard time multiplied by flow speed).

Hence, a receiving deterministic line card (e.g., "NIC") 22g, 22h, 22i, 22j of FIGS. 6A-6H in operation 208 can receive a deterministic data packet "i" via a corresponding deterministic link (e.g., "TSN link") 18. Each receiving deterministic network interface circuit (e.g., 22g, 22h, 22i, 22j) in operation 208 is configured for determining a latency (e.g., "dti") of the received deterministic packet 44 based on the grouping identifier 200 that can specify a specific estimated time of arrival, for example "ETA=T", where time "T" is an identifiable future time instance set by the source transport layer 14 in the source host device 10. Each receiving deterministic line card (e.g., 22g, 22h, 22i, 22j) in operation 208 is configured for determining the corresponding latency of a received deterministic packet 44 as a difference between the estimated time of arrival (ETA), specified in the received deterministic data packet 44 and allocated for the identifiable grouping of the transport layer packet 16, and an actual receive time "RxTime_i" determined by the deterministic network interface circuit 22 for the deterministic data packet 44.

For example, the deterministic network interface circuit 22g in operation 208 can detect reception of a deterministic data packet "i=1" 44 (carrying a transport layer packet 16 from group "A") from the TSN switch 22e at an actual receive time "RxTime_1" of eighty milliseconds (i.e., "RxTime_1=80 ms") relative to an epochal start time in the deterministic network of "t=0". In response to the deterministic network interface circuit 22g detecting the ETA (set by the source transport layer 14 for group "A" relative to the epochal start time of "t=0") of the deterministic data packet "i=1" having a value of "ETA_A=100 ms", the deterministic network interface circuit 22g can determine the latency of the received deterministic data packet "i=1" as "dt1=ETA_A-RxTime_1=100 ms-80 ms" or "dt1=20 ms".

In contrast, assume that the deterministic network interface circuit 22h in operation 208 detects reception of a deterministic data packet "i=2" (carrying another transport layer packet 16 also belonging to group "A") from the TSN switch 22f at an actual receive time "RxTime_2" of ninety milliseconds (i.e., "RxTime_2=90 ms") relative to the epochal start time "t=0". Hence, the deterministic network interface circuit 22h can determine the latency of the received deterministic data packet "i=2" as "dt2=ETA_A-RxTime_2=100 ms-80 ms" or "dt1=20 ms". As noted previously, the grouping identifier 200 can be based on the ETA value (e.g., "ETA=100 ms"); hence, a different ETA value (e.g., "ETA=110 ms") can serve as a different grouping identifier that indicates that the received transport layer packet specifying the different ETA value (e.g., "ETA=110 ms") belongs to a different identifiable grouping of data (e.g., group "B").

In FIG. 6C, the Egress Edge 22i has a perfect sense of what is now (in terms of a time value relative to the epochal start time in the deterministic network of "t=0") and of the delivery time T per its participation to the network time. The egress edge 22i in operation 208 computes the latency between the host 10 and itself as delta T between ETA time and now, dt1=T-Now, and stamps it in the packets for delivery to the end point "Host 2" over the DetNet User-to-Network Interface (DetNet-UNI) (illustrated, e.g., as 28 of FIGS. 1H-1J).

In FIG. 6E, the other Egress Edge 22j also has a perfect sense of Now and of delivery time T, and computes in operation 208 its corresponding latency as delta T between ETA time and now, dt2, and stamps it in the received transport layer packet.

Each of the deterministic line cards 22g, 22h (as well as 22i, 22j) in operation 210 can group the received transport layer packets 16 into a local buffer circuit 40 according to group identifier: for example the received transport layer packets 16 associated with group "A" can be stored in a first portion 40a of a buffer circuit 40, the received transport layer packets 16 associated with group "B" can be stored in a second portion 40b of a buffer circuit 40, etc. Each transport layer packet 16 also can be stored with metadata specifying the corresponding latency "dti" and grouping identifier (e.g., "ETA=100 ms" for group "A"; "ETA=110 ms" for group "B", etc.).

Each receiving deterministic network interface circuit (e.g., 22g, 22h, 22i, 22j) in operation 212 is configured for sending one or more received transport layer packets 16, to a transport layer processor device 28 (e.g., a TOR switching device 28), with corresponding instructions for grouping the transport layer packet, according to the latency "dti", with other received transport layer packets 16 having the same grouping identifier (e.g., "ETA=100 ms" for group "A") into a single processing group (e.g., in an allocated portion of a buffer circuit 40) for the transport layer processing of the single processing group. Hence, each receiving deterministic line card (e.g., 22g, 22h, 22i, 22j) can deliver an entire bunch as a single data transfer to a backplane CPU processor 12a that can store in operation 214 the bunch "A" in a reserved portion "A" in the buffer circuit 40, and assign the bunch "A" to a same processor core (e.g., 12b) for transport layer operations by a receiving transport layer 14a, regardless of the deterministic link 18 used to transport the transport layer packets 14. The backplane CPU processor 12a also can store each transport layer packet 16, per its corresponding instructions, for at least the specified latency "dti"; hence, the transport layer packet "i=1" (received at RxTime_1=80 ms) is stored in the reserved portion "A" for at least the specified latency "dt1=20 ms", whereas the transport layer packet "i=2" (received at RxTime_2=90 ms) is stored in the reserved portion "A" for at least the specified latency "dt2=10 ms".

Similarly, in FIG. 6F, both Packets (transported by link layer data packets 44c and 44d, respectively) are now stored in operation 214 in a NIC time gated queue 40a, this particular one waiting for delivery time T for delivery to the transport layer 14 in the "host 2".

Hence, the storing of both transport layer packets "i=1" and "i=2" associated with the single processing group "A" and stored in the buffer circuit 40 according to their respective latencies "dt1" and "dt2" can be forwarded in operation 216 of FIG. 7B at substantially a same arrival time to the receiving transport layer (e.g., 14a in the TSN switch 10" of FIG. 6H, or 14 in the "Host 2" of FIG. 6H).

Hence, the backplane processor 12a in the transport layer processing device 28 of FIG. 6H can forward all the transport layer packets associated with the single processing group "A", including the transport layer packet "i=1" and the other received transport layer packets (including "i=2"), to the receiving transport layer 14b executed by the processor core 12b as a single processing group "A" at substantially a same arrival time corresponding to the ETA "ETA=100 ms" based on the instructions associated with the transport layer packets in the single processing group "A".

In FIG. 6G, around Time=T (depending on NIC time precision, protected by the guard time) both copies of the transport layer packet are distributed in operation 216 to the Transport layer 14 (e.g., in the transport receive buffer 68) within a very narrow window of time.

As apparent from the foregoing, any received transport layer packets 16 having a different grouping identifier (e.g., "ETA=110 ms" for group "B") can be stored in a different reserved portion "B" in the buffer circuit 40, and the backplane CPU processor 12a can assign the bunch "B" to a different processor core (e.g., 12c) executing a different transport layer 14b. Hence, in response to the receiving deterministic network interface circuits (e.g., 22g, 22h) receiving in operation 208, via the deterministic links 18, different deterministic packets containing different transport layer packets specifying different grouping identifiers (e.g., "ETA=110 ms", "ETA=120 ms") for different identifiable groups of data, respectively (e.g., group "B", group "C"), the receiving deterministic network interface circuits (e.g., 22g, 22h) can determine in operation 208 the respective latencies "dti" of each of the different deterministic packets based on the respective grouping identifiers (e.g., "ETA=110 ms" for group "B", "ETA=120 ms" for group "C"), and send in operation 212 the different transport layer packets to the backplane processor 12a in the transport layer processing device 28, with respective instructions for grouping, according to the respective latencies, the different transport layer packets into respective processing groups in the buffer circuit 40.

In FIG. 6D, the receiving DetNet NIC (e.g., the device interface circuit 52 in the host 10' (or 10") 22i or 22j in operation 212 sends the instruction that causes the backplane processor in the "host 2" (not shown) to place in operation 214 the transport layer packet associated with group "A" in a time gated queue (e.g., in the device interface circuit 52 or the memory circuit 54) 40a allocated for the group "A", with instructions to store for at least the latency dt1, i.e., any transfer from the queue 40 to the transport layer 14 is delayed by at least dt1.

Hence, the backplane processor 12*a* in operations 216 and 218 can repeat the forwarding of all the transport layer packets 16 in group "B" at substantially the same arrival time "ETA=110 ms" to the transport layer 12*b* executed by the processor core 12*c*, and send all the transport layer packets 16 in group "C" at substantially the same arrival time "ETA=120 ms" to the transport layer 12*a* executed by the processor core 12*a* (having completed processing of the transport layer packets in group "A"). All transport layer packets associated with a bunch can be held in the NIC card until the above described same arrival time; in one embodiment, the bunch of transport layer packets can be passed to the selected core, e.g., using an interrupt; a packet received after that deadline will not have a core assigned, so it is dropped.

In one embodiment, the size of an identifiable group of transport layer packets (i.e., the bunch size) can be constrained by a number of factors, for example prescribed minimum (or maximum) number of packets that must be received to execute a certain operation; for example, if generating a coded packet out of 4 other packets, then the bunch size is a multiple of 5 packets.

The receiving transport layer (e.g., 14*a*) is configured for executing on the single processing group (e.g., group "A") in operation 220, any one or more of packet reordering into a proper transmit sequence based on respective transport sequence identifiers specified in the transport layer packets, elimination of any duplicate transport layer packet, or recovery of a lost transport layer packet based on an encoded transport layer packet in the single processing group.

The receiving transport layer (e.g., 14*a*) is configured for outputting in operation 222 the processed transport layer packets 16 associated with the single processing group (e.g., group "A"), for deterministic transmission to the next receiving transport layer (e.g., in the "Host 2" of FIG. 6H) via one or more of its transmitting deterministic network interface circuits, illustrated in FIG. 6H as deterministic line cards 22*g*' and 22*h*'.

According to the example embodiments the management of duplicate copies, network coding operations, and reordering is substantially simplified, by enabling a single core to process a small bunch of packets which contains all the related packets for the particular operation.

According to example embodiments, a Deterministic Switch or Router at the Egress Edge of the deterministic network passes a packet with a relative time until effective delivery. That time compensates for the jitter in the deterministic network. The receiving hosts queues the packet until that effective delivery time. The result is that packets are thus dequed in expected order (or very close to that), which enables the receiving DetNet transport layer to perform network coding, packet reordering and/or packet duplicate elimination with a minimal number of packets at hand.

Moreover, the same operations executed at the Egress edge at a destination host can be executed by an intermediate network device, enabling any errors between the transport layer packets in an identifiable group of data to be corrected. The correction of any errors by the intermediate network device can prevent such errors from growing in magnitude or severity as the transport layer packets are propagated along the deterministic data network. Hence, correction of relatively small errors by the intermediate network device prevents the introduction of substantially larger errors that would otherwise be detected by the destination host device. Further, numerous intermediate network devices can be added along a path between a source transport host and a destination transport host, for repeated correction to the transport layer packets, as needed. Any additional processing delays encountered by the correction by the intermediate network devices can be estimated and accounted for during scheduling of transmissions in the deterministic data network.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
receiving, by a transport layer executed by a processor circuit in an apparatus, an identifiable grouping of data;
storing, by the transport layer, the data as transport layer packets in a buffer circuit in the apparatus, the storing including inserting into each transport layer packet a grouping identifier that identifies the transport layer packets as belonging to the identifiable grouping; and
causing, by the transport layer, a plurality of transmitting deterministic network interface circuits to deterministically retrieve the transport layer packets from the buffer circuit for deterministic transmission across respective deterministic links, the grouping identifier enabling receiving deterministic network interface circuits to group the received transport layer packets, regardless of deterministic link, into a single processing group for a next receiving transport layer.

2. The method of claim 1, wherein the grouping identifier is any one of an estimated time of arrival (ETA) value determined for the identifiable grouping, or a flow identifier.

3. The method of claim 1, wherein the next receiving transport layer is one of a destination transport layer or an intermediate transport layer between the transport layer and the destination transport layer.

4. One or more non-transitory tangible media encoded with logic for execution by a machine and when executed by the machine operable for:
receiving, by a transport layer executed by a processor circuit in the machine, an identifiable grouping of data;
storing, by the transport layer, the data as transport layer packets in a buffer circuit in the machine, the storing including inserting into each transport layer packet a grouping identifier that identifies the transport layer packets as belonging to the identifiable grouping; and
causing, by the transport layer, a plurality of transmitting deterministic network interface circuits to deterministically retrieve the transport layer packets from the buffer circuit for deterministic transmission across respective deterministic links, the grouping identifier enabling receiving deterministic network interface circuits to group the received transport layer packets, regardless of deterministic link, into a single processing group for a next receiving transport layer.

5. The or more non-transitory tangible media of claim 4, wherein the grouping identifier is any one of an estimated time of arrival (ETA) value determined for the identifiable grouping, or a flow identifier.

6. The or more non-transitory tangible media of claim 4, wherein the next receiving transport layer is one of a destination transport layer or an intermediate transport layer between the transport layer and the destination transport layer.

7. A method comprising:
receiving, by a receiving deterministic network interface circuit, a deterministic packet via a deterministic link established with a transmitting deterministic network interface circuit, the deterministic packet containing a transport layer packet originated by a source transport layer and the transport layer packet specifying a grouping identifier that identifies the transport layer packet as belonging to an identifiable grouping of data;
determining, based on the grouping identifier, a latency of the deterministic packet via the deterministic link; and
sending the transport layer packet to a device with instructions for grouping the transport layer packet, according to the latency, with other received transport layer packets into a single processing group for processing by a receiving transport layer executed in the device.

8. The method of claim 7, further comprising:
the device storing the transport layer packet in a buffer circuit for at least the latency specified in the instructions;
the device receiving the other received transport layer packets, each specifying the grouping identifier and respective instructions identifying respective latencies, from at least a second receiving deterministic network interface circuit having received the other received transport layer packets via a corresponding deterministic link with a corresponding second transmitting deterministic network interface circuit;
the device storing the other received transport layer packets in the buffer circuit for at least the latencies specified in the instructions, respectively;
the device forwarding all the transport layer packets associated with the single processing group, stored in the buffer circuit, at substantially a same arrival time to the receiving transport layer.

9. The method of claim 7, wherein the determining comprises determining the latency of the deterministic packet as a difference between an estimated time of arrival (ETA), specified in the deterministic data packet and allocated for the identifiable grouping, and an actual receive time determined by the receiving deterministic network interface circuit for the deterministic data packet.

10. The method of claim 9, further comprising the device forwarding all the transport layer packets associated with the single processing group, including the transport layer packet and the other received transport layer packets, to the receiving transport layer as said single processing group at substantially a same arrival time corresponding to the ETA based on the instructions associated with the transport layer packets in the single processing group.

11. The method of claim 7, further comprising:
the receiving deterministic network interface circuit receiving, via the deterministic link, different deterministic packets containing different transport layer packets specifying different grouping identifiers for different identifiable groups of data, respectively;
the receiving deterministic network interface circuit determining the respective latencies of each of the different deterministic packets based on the respective grouping identifiers, and sending to the device the different transport layer packets with respective instructions for grouping, according to the respective latencies, the different transport layer packets into respective processing groups.

12. The method of claim 11, further comprising:
the device forwarding all the different transport layer packets associated with each processing group, to one of the receiving transport layer or a second receiving transport layer executed in the device, as a corresponding processing group at substantially a same corresponding arrival time based on the instructions associated with the transport layer packets in the corresponding processing group.

13. The method of claim 7, further comprising:
the receiving transport layer executing, as said processing on the single processing group, at least one of packet reordering into a proper transmit sequence based on respective transport sequence identifiers specified in the transport layer packets, elimination of any duplicate transport layer packet, or recovery of a lost transport layer packet based on an encoded transport layer packet in the single processing group;
the receiving transport layer outputting the transport layer packets associated with the single processing group, following said processing, as processed transport layer packets for deterministic transmission to a next receiving transport layer via respective second transmitting deterministic network interface circuits.

14. An apparatus comprising:
a plurality of deterministic network interface circuits, each deterministic network interface circuit configured for receiving a deterministic packet via a deterministic link established with a corresponding transmitting deterministic network interface circuit, the deterministic packet containing a transport layer packet originated by a source transport layer and the transport layer packet specifying a grouping identifier that identifies the transport layer packet as belonging to an identifiable grouping of data;
each deterministic network interface circuit configured for determining, based on the grouping identifier, a latency of the deterministic packet via the deterministic link; and
a transport layer processor device configured for executing a receiving transport layer for transport layer processing of received transport layer packets;
wherein each deterministic network interface circuit is configured for sending the transport layer packet, to the transport layer processor device, with instructions for grouping the transport layer packet, according to the latency, with other received transport layer packets into a single processing group for the transport layer processing of the single processing group.

15. The apparatus of claim 14, further comprising:
a buffer circuit configured for storing the transport layer packet received by the transport layer processor device for at least the latency specified in the instructions;
the transport layer processor device configured for receiving the other received transport layer packets, each specifying the grouping identifier and respective instructions identifying respective latencies, from at least a second of the deterministic network interface circuit having received the other received transport layer packets via the corresponding deterministic link;
the buffer circuit configured for storing the other received transport layer packets for at least the latencies specified in the instructions, respectively;
the transport layer processor device configured for forwarding all the transport layer packets associated with the single processing group, stored in the buffer circuit, at substantially a same arrival time to the receiving transport layer.

16. The apparatus of claim 14, wherein:
- each deterministic network interface circuit is configured for receiving, via the corresponding deterministic link, different deterministic packets containing different transport layer packets specifying different grouping identifiers for different identifiable groups of data, respectively;
- each deterministic network interface circuit configured for determining the respective latencies of each of the different deterministic packets based on the respective grouping identifiers, and sending to the transport layer processor device the different transport layer packets with respective instructions for grouping, according to the respective latencies, the different transport layer packets into respective processing groups.

17. The apparatus of claim 16, wherein:
- the transport layer processor device comprises a first processor circuit configured for executing the receiving transport layer and a second processor circuit configured for executing a second receiving transport layer;
- the transport layer processor device configured for forwarding all the different transport layer packets associated with each processing group, to one of the first processor circuit configured for executing the receiving transport layer or the second processor circuit configured for executing the second receiving transport layer, as a corresponding processing group at substantially a same corresponding arrival time based on the instructions associated with the transport layer packets in the corresponding processing group.

18. The apparatus of claim 14, further comprising second transmitting deterministic network interface circuits configured for transmitting, via respective deterministic links, to a next receiving transport layer, wherein:
- the receiving transport layer is configured for executing, as said processing on the single processing group, at least one of packet reordering into a proper transmit sequence based on respective transport sequence identifiers specified in the transport layer packets, elimination of any duplicate transport layer packet, or recovery of a lost transport layer packet based on an encoded transport layer packet in the single processing group;
- the receiving transport layer is configured for outputting the transport layer packets associated with the single processing group, following said processing, as processed transport layer packets for deterministic transmission to the next receiving transport layer via one or more of the second transmitting deterministic network interface circuits.

19. One or more non-transitory tangible media encoded with logic for execution by a machine and when executed by the machine operable for:
- receiving, by a receiving deterministic network interface circuit, a deterministic packet via a deterministic link established with a transmitting deterministic network interface circuit, the deterministic packet containing a transport layer packet originated by a source transport layer and the transport layer packet specifying a grouping identifier that identifies the transport layer packet as belonging to an identifiable grouping of data;
- determining, based on the grouping identifier, a latency of the deterministic packet via the deterministic link; and
- sending the transport layer packet to a device with instructions for grouping the transport layer packet, according to the latency, with other received transport layer packets into a single processing group for processing by a receiving transport layer executed in the device.

20. The one or more non-transitory tangible media of claim 19, further operable for:
- the receiving deterministic network interface circuit receiving, via the deterministic link, different deterministic packets containing different transport layer packets specifying different grouping identifiers for different identifiable groups of data, respectively;
- the receiving deterministic network interface circuit determining the respective latencies of each of the different deterministic packets based on the respective grouping identifiers, and sending to the device the different transport layer packets with respective instructions for grouping, according to the respective latencies, the different transport layer packets into respective processing groups.

* * * * *